US011562297B2

(12) United States Patent
Goldszmidt et al.

(10) Patent No.: US 11,562,297 B2
(45) Date of Patent: Jan. 24, 2023

(54) AUTOMATED INPUT-DATA MONITORING TO DYNAMICALLY ADAPT MACHINE-LEARNING TECHNIQUES

(71) Applicant: Apple Inc., Cupertino, CA (US)

(72) Inventors: Moises Goldszmidt, Palo Alto, CA (US); Anatoly D. Adamov, Palo Alto, CA (US); Juan C. Garcia, San Francisco, CA (US); Julia R. Reisler, Kirkland, WA (US); Timothy S. Paek, Mercer Island, WA (US); Vishwas Kulkarni, Redmond, WA (US); Yu-Chung Hsiao, Millbrae, CA (US); Pavan Chitta, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 16/875,825

(22) Filed: May 15, 2020

(65) Prior Publication Data
US 2021/0224687 A1 Jul. 22, 2021

Related U.S. Application Data

(60) Provisional application No. 62/962,703, filed on Jan. 17, 2020.

(51) Int. Cl.
*G06N 20/00* (2019.01)
*G06K 9/62* (2022.01)

(52) U.S. Cl.
CPC .......... *G06N 20/00* (2019.01); *G06K 9/6256* (2013.01); *G06K 9/6262* (2013.01); *G06K 9/6277* (2013.01)

(58) Field of Classification Search
CPC ........ G06N 20/00; G06N 5/003; G06N 7/005; G06N 20/10; G06N 20/20; G06K 9/6256; G06K 9/6262; G06K 9/6277; G06K 9/6268
See application file for complete search history.

(56) References Cited

U.S. PATENT DOCUMENTS

| 10,726,356 | B1* | 7/2020 | Zarandioon | G06N 7/005 |
|---|---|---|---|---|
| 10,754,764 | B2* | 8/2020 | Lekivetz | G06N 3/084 |
| 10,916,333 | B1* | 2/2021 | Yeturu | G06N 5/003 |
| 11,217,226 | B2* | 1/2022 | Beaver | G10L 15/063 |
| 11,250,342 | B2* | 2/2022 | Maor | G06F 16/285 |
| 2009/0030862 | A1* | 1/2009 | King | G06F 16/35 |
| | | | | 706/45 |
| 2013/0254153 | A1* | 9/2013 | Marcheret | G06N 20/00 |
| | | | | 706/59 |
| 2016/0210535 | A1* | 7/2016 | Takimoto | G06V 10/771 |
| 2017/0169105 | A1* | 6/2017 | Andrade Silva | G06N 20/00 |
| 2017/0330109 | A1* | 11/2017 | Maughan | G06N 5/04 |

(Continued)

*Primary Examiner* — Lewis G West
(74) *Attorney, Agent, or Firm* — Kilpatrick Townsend & Stockton LLP

(57) ABSTRACT

Systems and methods are disclosed for triggering an update to a machine-learning model upon detecting that a distribution of particular (e.g., recently collected) input data set is sufficiently different from a distribution training input data set used to train the model. The distributions may be determined to be sufficiently different when a classifier can identify to which distribution individual data elements belong (e.g., to at least a predetermined degree). An update to the machine-learning model can include morphing weights used by the model and/or retraining the model.

20 Claims, 7 Drawing Sheets

(56) References Cited

U.S. PATENT DOCUMENTS

| | | | | |
|---|---|---|---|---|
| 2017/0372232 | A1* | 12/2017 | Maughan | G06F 3/0482 |
| 2019/0050564 | A1* | 2/2019 | Pogorelik | G06N 3/0472 |
| 2019/0087529 | A1* | 3/2019 | Steingrimsson | G06F 16/2465 |
| 2019/0236409 | A1* | 8/2019 | Van Der Stockt | G06K 9/6215 |
| 2019/0286990 | A1* | 9/2019 | Kenney | G06N 3/0445 |
| 2019/0287016 | A1* | 9/2019 | Katoh | G06N 20/00 |
| 2019/0370665 | A1* | 12/2019 | David | G06N 3/086 |
| 2020/0012963 | A1* | 1/2020 | Johnston | G06N 20/20 |
| 2020/0104357 | A1* | 4/2020 | Bellegarda | G06N 3/088 |
| 2020/0219619 | A1* | 7/2020 | Feczko | G06N 20/20 |
| 2020/0279192 | A1* | 9/2020 | Godfrey | G06K 9/6264 |
| 2020/0394559 | A1* | 12/2020 | Zhang | G06N 3/0472 |
| 2021/0075875 | A1* | 3/2021 | Liu | H04L 67/55 |
| 2021/0097433 | A1* | 4/2021 | Olgiati | G06N 20/00 |
| 2021/0117718 | A1* | 4/2021 | Badjatiya | G06K 9/6271 |
| 2021/0133580 | A1* | 5/2021 | Mehl | G06N 7/005 |
| 2021/0142160 | A1* | 5/2021 | Mohseni | G06N 3/0454 |
| 2021/0166080 | A1* | 6/2021 | Podder | G06K 9/6262 |
| 2021/0224687 | A1* | 7/2021 | Goldszmidt | G06K 9/6268 |
| 2021/0279607 | A1* | 9/2021 | Bhide | G06N 5/003 |
| 2021/0312307 | A1* | 10/2021 | Hazard | G06N 5/022 |
| 2021/0326652 | A1* | 10/2021 | Hazard | G06N 20/00 |
| 2021/0326706 | A1* | 10/2021 | Bakker | G06N 3/08 |
| 2021/0383268 | A1* | 12/2021 | Miroshnikov | G06F 17/16 |
| 2021/0383525 | A1* | 12/2021 | Lee | G06N 3/084 |
| 2021/0390455 | A1* | 12/2021 | Schierz | G06N 5/04 |
| 2022/0222807 | A1* | 7/2022 | Tae | G05B 19/4183 |

* cited by examiner

AUTOMATED INPUT-DATA MONITORING TO DYNAMICALLY ADAPT MACHINE-LEARNING TECHNIQUES

CROSS-REFERENCE TO RELATED APPLICATIONS

This application claims the benefit of and priority to U.S. Provisional Application 62/962,703, filed on Jan. 17, 2020, which is hereby incorporated by reference in its entirety for all purposes.

BACKGROUND

In machine learning, a data set is used to train a machine-learning model. The data set may include input data elements and labels. Performance metrics for the model may be computed by processing one or more validation or testing portions of the data set to compare model-predicted labels with the true labels. Performance metrics can include (for example) precision, recall and/or derivative metrics. The metrics may be useful to determine whether training is to be completed, whether to attempt to access a larger training data set, whether to adjust hyperparameters and/or whether to explore using a different type of model. Frequently, once performance metrics are deemed to be satisfactory, the model is deployed to be used to process other unlabeled input data elements.

However, the performance metrics characterize how the model performed for a type of data represented in the validation or testing data-set portions. If a distribution of input data subsequently changes, the performance metrics may fail to accurately represent the model's performance. This is in contrast to other software components of a system, where performance guarantees are not tied to input-data distributions but rather to engineering considerations.

Further, some process flows involve multiple interdependent models, where an input fed to a given model includes or is based on an output produced by another model. In this instance, an update to the other model can cause an input-data shift for the given model and can render performance metrics less accurate or inaccurate to the new context. Thus, a system may be brittle, not only to changes in patterns of utilization by users in the field, but also to changes and improvements of other components in the system.

SUMMARY

Techniques are provided for detecting and responding to changes in input distributions. Dependencies between components can be assessed to find attribute of culprit models. It can then be determined whether to retrain the culprit model(s) and/or whether to identify new labels for the retraining.

More specifically, input data corresponding to a training data set can be compared to input data from a non-training (e.g., production) data set. The comparison may include determining whether a statistically significant deviation, change point and/or covariate shift has occurred. The comparison may involve (for example) using a classifier to predict, for each of a set of input data elements, whether (or a probability that) the input data element corresponds to the training data set versus the non-training data set. If the classifier cannot determine to which data set an input data element belongs (e.g., to some predefined degree), it may be inferred that input data elements from the training data set are sufficiently representative of input data elements from the non-training data set and that performance metrics previously obtained for a machine-learning model continue to apply.

If the classifier can accurately predict to which data set individual input data elements correspond (indicating that the input data sets are distinguishable), it may be determined whether a morphing of distribution of the input data elements in the training data set sufficiently corresponds to a distribution of the input data elements in the non-training data set. It may be determined that such a morphing is sufficient for the correspondence when (for example) a classifier cannot determine to which of the morphed training data set and the non-training data set individual data elements (e.g., from the non-training data set) belong.

If a morphing is sufficient, a set of morphing attributes (e.g., morphing weights) can be used to evaluate the effect of the distribution shift on the performance metrics of the machine-learning model. If the impact is deemed negative, then the morphed distribution can be used to modify the machine-learning model parameters. The modification may have an effect of biasing towards different labels in some or all instances. If morphing is insufficient to (for example) achieve a threshold classification performance level, it may be determined what portion(s) of an input space were underrepresented (or not represented or not sufficiently represented) in the training data set as compared to the non-training data set. Labeled training data inclusive of the portion(s) of the input space may then be obtained (e.g., amounting to obtaining labels for at least part of the non-training data set or for accessing additional labeled data not represented in the training or non-training data sets). The machine-learning model may then be re-trained.

An augmented training data set can include some or all of the initial training data set and the newly obtained labeled training data. A distribution of the input data elements from the augmented training data set can be processed (e.g., compared to a distribution of the input data elements from the non-training data set and/or morphed) in a similar manner as was the distribution of the input data elements from the initial training data set. Thus, the assessments of input-data distributions and/or securing additional labeled data may be iteratively performed (e.g., until a covariate shift is no longer detected and/or until distributions are not sufficiently distinct).

In some instances, morphing of the distribution of input elements in the training data set may be iteratively determined and evaluated. The iterative morphing identifications and assessments may continue until the morphed distribution of input data elements in the training data are determined to sufficiently correspond (and/or match) the distribution of the input data elements in the non-training data set or until a morphing has resulted in assigning more than a threshold amount of percentage of the input data elements in the training data set to have a morphing weight that is below a predetermined weight threshold. For example, it may be determined to cease the iterative morphing assessment when a count of input data elements having been assigned morphing weights that are above a weight threshold is less than 100 or less than 1,000.

In some instances, a machine-learning model is trained using a training data set that includes first training input data elements (e.g., that may be multi-dimensional). The trained machine-learning model can be associated with a first performance metric. The first performance metric may have been generate using a validation, test and/or hold-out data set. For example, the trained machine-learning model can process input elements from the validation, test and/or hold-out data set to generate predicted outputs, and the predicted outputs can be compared to real outputs. A performance metric may represent (for example) an accuracy of the predictions and/or a correspondence (e.g., correlation) between the predictions and real outputs. The trained machine-learning model can be used to process other input data (e.g., production input data), which may be multi-dimensional. The other input data may be processed at (for example) a computing system that is different from a computing system used to train the model. A second performance metric may be generated to characterize (for example) an accuracy, reasonableness and/or predictive value of predictions generated by the trained model made using the other input data. The second performance metric may be of a same type of variable as the first performance metric. The second performance metric may be generated by (for example) monitoring subsequent device usage, content usage, content selection, etc. For example, a machine-learning model may be configured to predict whether acceleration data indicates that a user wants to use a device. If the model predicts that acceleration data is indicative of usage intent, the device may wake from a sleep mode, and the device can determine whether any user input is subsequently detected (in which case it may be inferred that the prediction was accurate). As another example, a machine-learning model may be configured to predict particular content links that are responsive to particular queries. It may be inferred that a prediction was reasonable if a user clicked on a presented link. In some instances, the second performance metric may exceed the first performance metric. The first training input data elements and the other input data can be analyzed to investigate the performance difference. For example, individual input data elements can be processed by a classifier, and the classification results can be used to infer whether the first training input data elements are representative of a use case corresponding to the other input data. As another alternative or additional example, a set of morphing weights based on distributions of the first training input data elements and of the other input data. The set of morphing weights can be used to identify one or more first particular types of inputs and/or one or more first input subspaces for which the model is particularly accurate and/or one or more second particular types of inputs and/or one or more second input subspaces for which the model is particularly inaccurate. One or more processing pipelines and/or device configurations can be adjusted to preferentially use the machine-learning model to process inputs of the one or more first particular types and/or within the one or more first input subspaces and/or to bias against (or not use) the machine-learning model to process inputs of the one or more second particular types and/or within the one or more second subspaces.

In some instances, a classification-based assessment can be used to detect patterns, which may inform subsequent model-configuration selection. For example, outputs from classifier (e.g., indicating whether two input data sets are distinguishable) and/or morphing weights (e.g., used to morph a distribution associated with one input data set into a distribution associated with another input data set) may be processed to detect one or more cyclic or non-cyclic patterns. To illustrate, at each of a set of time points, one or more recent data points in a recent data set can be processed by a classifier, which can output predictions as to whether each of the one or more recent data points is from the recent data set or another data set (e.g., a binary prediction or a probability of each of the one or more recent data points as being part of the recent data set). The output may (but need not) further include a confidence value. A classification metric can be generated based on the predictions and/or confidence values. The classification metrics can be examined across time to identify any temporal patterns. For example, it may be determined that input data is distinguishable from a given baseline input data set during summer months. In response to this determination, morphing weights and/or a different machine-learning model can be used to process input data received (e.g., subsequently received) during the summer.

As another illustration, an input space may correspond to categories of content corresponding to user-device queries. A pattern analysis may detect that: (1) morphing weights for a portion of an input space associated with "Christmas" and "Hanukkah" are high during a late November-early December time period; (2) morphing weights for a portion of an input space associated with "Super Bowl" are high in January; and/or (3) morphing weights for a portion of an input space associated with "movie recommendations" are high in the evenings. As another example, a pattern analysis may detect that morphing weights for a portion of an input space associated with "DVDs" are decreasing in time. The pattern may be used to automatically adjust subsequent operation. An exemplary pattern usage is to implement one or more biases when identifying query results to return based on a time at which a query was submitted and the pattern. As a result of the above-noted potential patterns, a query that is submitted: (1) in early December that corresponds to "gift ideas" may be more likely to return stocking-stuff ideas as compared to a query submitted in July; (2) in January that corresponds to "what time is the game?" may be more likely to return a result identifying a time of an upcoming Super Bowl as compared to a query submitted in October; and/or (3) in the evening that corresponds to "famous actors" may be less likely to return a result identifying a retired actor as compared to a query submitted in the morning. The biases may be implemented (for example) by dynamically selecting or determining which set of morphing weights to use based on the pattern (e.g., and a current time) and/or by dynamically selecting or determining machine-learning model parameters to use based on the pattern (e.g., and a current time). For example, a machine-learning model may be trained to learn a set of parameters. The parameters may be used to (for example) assign a score to each of a set of potential instances and to determine a result based on the score. A bias may (for example) adjust the score based on an input-space position corresponding to the input and a time associated with an input or adjust an algorithm (e.g., and/or algorithm hyperparameters) used to generate the score based on an input-space position corresponding to the input and a time associated with the input.

In some instances, a technique disclosed herein can be used to compare characteristics of an input data set that was used to train a machine-learning model to characteristics of another input data set. For example, it may be determined whether a classifier can distinguish (e.g., to a threshold degree) whether a given input data element is part of a training data set versus part of a testing data set, production data set and/or recent data set. If the classifier can distinguish the training data set from another data set, it may be inferred that the training data set is biased. A set of morphing weights may be calculated based on a distribution of training input data elements a distribution of elements within the other data set. The set of morphing weights may be used to characterize and/or to potentially correct for all or part of the bias. To illustrate, a morphing weight may indicate that input elements within a given subspace of an input space are 10-fold more prevalent in the training input data set as compared to in an independent testing input data set. The subspace may be assessed and characterized as corresponding to one or more values (or value ranges) associated with one or more variables. It may be inferred that the training data set is biased towards these values (e.g., and/or against one or more other values or value ranges associated with the one or more variables). In some instances, the training data set can be pruned to remove some of the training elements corresponding to the subspace, such that and/or until a morphing weight associated with the space indicates or more closely indicates that a probability of training input elements being within the space is similar to (e.g., as represented by an adjusted morphing weight being within a target range) and/or the same as a probability of input elements within the other data set being within the subspace. As another illustration, a morphing weight may indicate that there are relative few (or even no) training input data elements within a subspace of an input space as compared to a proportion of input data elements of the other data set that are within the subspace. In some instances, the training data set can be pruned to remove some of the training elements corresponding to one or more other subspaces (e.g., to have an effect of increasing the proportion of training input data elements that are associated with what was the under-represented subspace). The subspace and one or more other subspace may correspond to different values of a same variable. In some instances, new training data elements are collected that include training input data elements that are within the subspace (e.g., and that include corresponding labels). The training data set can then be augmented with the new training data elements. A machine-learning model can then be trained using the augmented training data set and/or the newly collected training data elements.

In some instances, a classifier is used to facilitate selecting data elements to include in a training data set. For example, an initial training set may have been defined using a rather intensive (e.g., labor intensive and/or costly) technique. Such definition may include using experts to distinguish particular types of data from other types of data. A particular illustration may include identifying training data elements that correspond to a language that is generally rarely used or rarely used in a given context (e.g., within a particular geography and/or by one or more people who are controlling training of and/or deployment of a machine-learning model). The training data set may nonetheless be built (e.g., by hiring an expert or by looking up individual words and phrases to identify the language), though the training data set may be small. A data store (e.g., corresponding to content on the Internet and/or to one or more sites on the Internet) may include many more instances that correspond to a data type of interest, though it may be difficult and/or time consuming to identify this subset of the data store. To facilitate this process, each of multiple input data elements stored in the data store may be fed to the classifier, which can predict whether the input data element was from the training data set or the data-store data set. If the classifier predicts that a given data element was from the training data set (e.g., despite actually being from the data store), it may be inferred that the given data element is of a same data type as data in the training data set. The training data set may then be augmented to include the given data element. In some instances, the augmentation is performed when a confidence metric and/or probability metric (e.g., generated by the classifier) corresponding to a prediction as to whether the data element is from the training data set is above a predefined threshold (e.g., above 50%, above 55%, above 60%, above 65%, above 70%, above 75%, above 80%, above 85%, above 90% or above 95%). Augmenting a training data set using a classifier may be particularly advantageous when the machine-learning model is trained using unsupervised learning.

In some instances, each of a set of models is trained using a different training data set. In some instances, each of one, more or all of the set of models have a same model architecture and/or same set of hyperparameters (e.g., and have different learned parameters). In some instances, two or more of the set of models have different model architectures and/or different hyperparameters. Each of the set of models may correspond to (for example) a different user profile and/or a different circumstance. For example, one model may pertain to an at-work circumstance, while one model may pertain to an at-home circumstance. As another example, one model may pertain to a student user profile, while one model may pertain to a non-student user profile. As yet another example, one model may pertain to a sports-fan user profile; one model may pertain to a tech-enthusiast user profile; one model may pertain to a cooking-interest user profile; etc. As still another example, multiple models may correspond to different types of movements sequences that various users may use to left a device from a relaxed not-in-use position to an in-use position (e.g., to bring a hand wearing a watch from down by a user's side to in front of a user's face). While exemplary model characterizations are provided for illustrative purposes, explicit designations and/or characterizations of the model need not be made. Each model may have been trained using a corresponding training data set. Training data sets may be unique across the set of models. The set of models (e.g., and/or corresponding learned parameters) may be stored at a given computing system (e.g., user device) and/or remote from the given computing system (e.g., in the cloud). At least part of the training data (e.g., at least some of training input elements) and/or a characterization thereof (e.g., distribution of training input elements) can further be stored at the computing system or remote from the computing system. A new input data set can be collected that is specific to a given user and/or circumstance. For example, the new input data set can include accelerometer data collected during a time period beginning when a device is first configured by a user. As another example, a new input data set may track search queries submitted over a 30-minute period every 4 hours. For each model of the set of models, a classifier can predict whether input elements in the new input data set correspond to an input data set used to train the model or to the new input data set. A prediction may include (for example) a binary prediction, a probability (e.g., that the data element corresponds to the model-training input data set) and/or a prediction confidence. For each model, one or more metrics can be generated based on the predictions, with the metric(s) characterizing a degree to which the classifier could accurately and/or confidently predict to which input data set individual data elements correspond. Metrics can be compared across models. A model from among the set of models can be selected for use based on the comparison. The model that is selected may be a model associated with poor or the poorest classification results, indicating that it was relatively unsuccessful in predicting whether data elements from the new input data set were from the new input data set versus an input data set used to train the model. Thus, it may be inferred that training data used to train the selected model corresponds to and/or is representative of the type of data that will be observed in a given use context (associated with the new input data set).

In some instances, a computer-implemented method is provided. A first training input data set can be accessed. The first training input data set can include a plurality of first input data elements. The first training input data set and a corresponding training label data set may have been used to learn a set of parameter values during training of a machine-learning model. The corresponding training label data set can include a plurality of labels. Each of the plurality of first input data elements can be multi-dimensional. A second input data set can be accessed. The second input data set can include a plurality of second input data elements. For each input data element of the plurality of first input data elements and of the plurality of second input data elements, a classification output can be generated that corresponds to a prediction as to whether the input data element is a sample from the first training input data set. It can be determined whether a distribution of the first training input data set sufficiently corresponds to a distribution of the second input data set based on the classification outputs.

In some instances, when it is determined that the first training input data set does not sufficiently correspond to the second input data set, a morphed version of the distribution of the first training input data set can be generated based on the distribution of the second input data set, the morphed version of the distribution of the first training input data set being generated by applying a set of morphing weights to the plurality of first input data elements. It can be determined whether the morphed version of the distribution of the first training input data set sufficiently corresponds to the distribution of the second input data set. When it is determined that the morphed version of the distribution of the first training input data set sufficiently corresponds to the distribution of the second input data set, a performance metric can be calculated for the machine-learning model configured with the set of parameters in a context of the morphed version of the distribution of the first training input data set. It can be determined, based on the performance metric, whether a criteria indicative of performance degradation has been satisfied.

In some instances, the set of parameter values can be updated using the set of morphing weights, at least some of the plurality of first input data elements and at least some of the plurality of labels.

In some instances, when it is determined that the morphed version of the distribution of the first training input data set does not sufficiently correspond to the distribution of the second input data set, the classification outputs can be used to identify a subset of the plurality of second input data elements determined to be sufficiently different from the plurality of first input data elements. A label for each second input data element of the subset can be obtained, and the labels can be used to learn another set of parameter values for the machine-learning model.

In some instances, another machine-learning model may have been used to generate the classification outputs and further to generate a set of corresponding confidence metrics. The method may further include determining the set of morphing weights using the set of confidence metrics.

In some instances, when it is determined that the first training input data set sufficiently corresponds to the second input data set, the machine-learning model, configured with the set of parameter values, can be availed for subsequent use to process subsequently detected input data elements.

In some instances, each of the first input data elements correspond to a first user of one or more first users and/or a first device of one or more first devices and each of the second input data elements corresponds to a second user different than each of the one or more first users; and/or a second device different than each of the one or more first devices. The method can further include, when it is determined that the first training input data set does not sufficiently correspond to the second input data set, inhibiting subsequent use of the machine-learning model configured with set of parameters in a context of processing other input data elements that correspond to the second user and/or to the second device.

In some instances, the classification outputs may be generated using another machine-learning model that includes a decision-tree model, regression model, a support vector machine, or a random-forest model.

In some instances, determining whether the distribution of the first training input data set sufficiently corresponds to the distribution of the second input data set can include generating a receiver-operator curve using the classification outputs, determining an area under the receiver-operator curve and determining whether the area under the receiver-operator curve is below a pre-determined threshold.

In some embodiments, a computer-implemented is provided. Multiple input data sets can be accessed, each input data set of the multiple input data sets including a plurality of input data elements. Each input data set of the multiple input data sets can correspond to a distinct time period relative to the time period associated with each other input data set of the multiple input data sets. For each input data set of the multiple input data sets, a set of morphing weights can be determined that correspond to differences in a distribution of the plurality of input data elements across an input data space relative to a distribution of other input data elements across the input data space. The other input data elements can correspond to another input data set of the multiple input data sets or to a baseline input data set. A morphing-weight temporal pattern can be determined using the sets of morphing weights and the distinct time periods corresponding to the multiple input data sets. A new input data element corresponding to a particular time point can be accessed. A result for the new input data element can be determined based on the particular time point, the morphing-weight temporal pattern, and a machine-learning model configured with a particular set of learned parameters. The result can be output.

The method may further include, for each input data set of at least two of the multiple input data sets, accessing a label data set corresponding to the input data set and training the machine-learning model by learning a set of parameter values using the input data set and the label set. Determining the result can include identifying, using the learned sets of parameters, the particular set of learned parameters to associate with the new input data element based on the particular time point and the morphing-weight temporal pattern.

In some embodiments, a computer-implemented is provided. Multiple input data sets can be accessed, each input data set of the multiple input data sets including a plurality of input data elements. Each input data set of the multiple input data sets can correspond to a distinct time period relative to the time period associated with each other input data set of the multiple input data sets. For each input data set of the multiple input data sets, a classification metric is determined that characterizes a degree to which a classifier accurately and/or confidently classified at least some of the plurality of input data elements in the input data set as being part of the input data set as opposed to being part of another input data set of the multiple input data sets or to a baseline input data set. A temporal pattern can be determined using the classification metrics and the distinct time periods corresponding to the multiple input data sets. A new input data element corresponding to a particular time point can be accessed. A result for the new input data element can be determined based on the particular time point, the temporal pattern, and a machine-learning model configured with a particular set of learned parameters. The result can be output.

In some embodiments, a computer-implemented is provided. A first training input data set can be accessed. The first training input data set can include a plurality of first input data elements. The first training input data set and a corresponding training label data set may have been used to learn a set of parameter values during training of a machine-learning model. The corresponding training label data set can include a plurality of labels. Each of the plurality of first input data elements can be multi-dimensional. A second input data set can be accessed. The second input data set can include a plurality of second input data elements. A third input data element can be accessed. Using a classifier, a probability that the third input data element corresponds to a first distribution representing the first training input data set (e.g., as opposed to a second distribution representing the second input data set) can be determined. When the probability is within a predefined range, the first training data set can be augmented with the third input data element.

In some embodiments, a computer-implemented is provided. A set of input-data representations can be stored on an electronic device. Each of the set of input-data representations can correspond to a profile of a user and/or circumstance. Each of the set of input-data representations can characterize a distribution of multiple input data elements. A new input data element can be received at the electronic device. Using a classifier, a particular input-data representation of the set of input-data representations can be identified as one to which the new input data element corresponds. A trained machine-learning model associated with the particular input-data representation can be retrieved from a data store of the electronic device. The new input data element or another new input data element received after the new input data element can be processed using the trained machine-learning model to generate a result. An operation of the electronic device can be performed using the result. The operation may include (for example) generating and/or presenting a notification and/or generating and transmitting a communication.

In some embodiments, a computer-implemented is provided. A first training input data set that includes a plurality of first input data elements can be accessed. The first training input data set and a corresponding training label data set may have been used to learn a set of parameter values during training of a machine-learning model. The corresponding training label data set can include a plurality of labels. Each of the plurality of first input data elements can be multi-dimensional. A second input data set that includes a plurality of second input data elements can be accessed. A first accuracy metric can be determined that characterizes a first performance of the machine-learning model using a first testing data set. The first testing data set can include at least part of the first training input data set and at least part of the corresponding label data set; or at least part of a first training input data superset and at least part of a first label data superset (e.g., the first training input data set being a subset of the first training input data superset) and the corresponding training label data set being a subset of the first label data superset. A second accuracy metric can be determined that characterizes a second performance of the machine-learning model using a second testing data set. The second testing data set can include the second input data set and a second corresponding training label data set. A set of morphing weights can be determined that correspond to differences in a distribution of the plurality of second input data elements across an input data space relative to a distribution of baseline input data elements across the input data space. The baseline input data elements can include the plurality of first input data elements and/or the at least part of the first training input data superset. The set of morphing weights can be used to predict a subspace of the input data space for which performance of the machine-learning model is high relative to one or more other subspaces of the input data space.

In some instances, the method further include outputting an identification of the subspace. In some instances, the method further includes receiving a new input data element and selecting, from among a set of trained machine-learning models, a particular trained machine-learning model to be executed. Each of the set of trained machine-learning models can correspond to an associated set of learned parameters. The set of trained machine-learning models can include the trained machine-learning model. The selection can be biased towards selecting the machine-learning model when the new input data element is within the subspace of the input data space. The new input data element can be processed using the particular trained machine-learning model.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
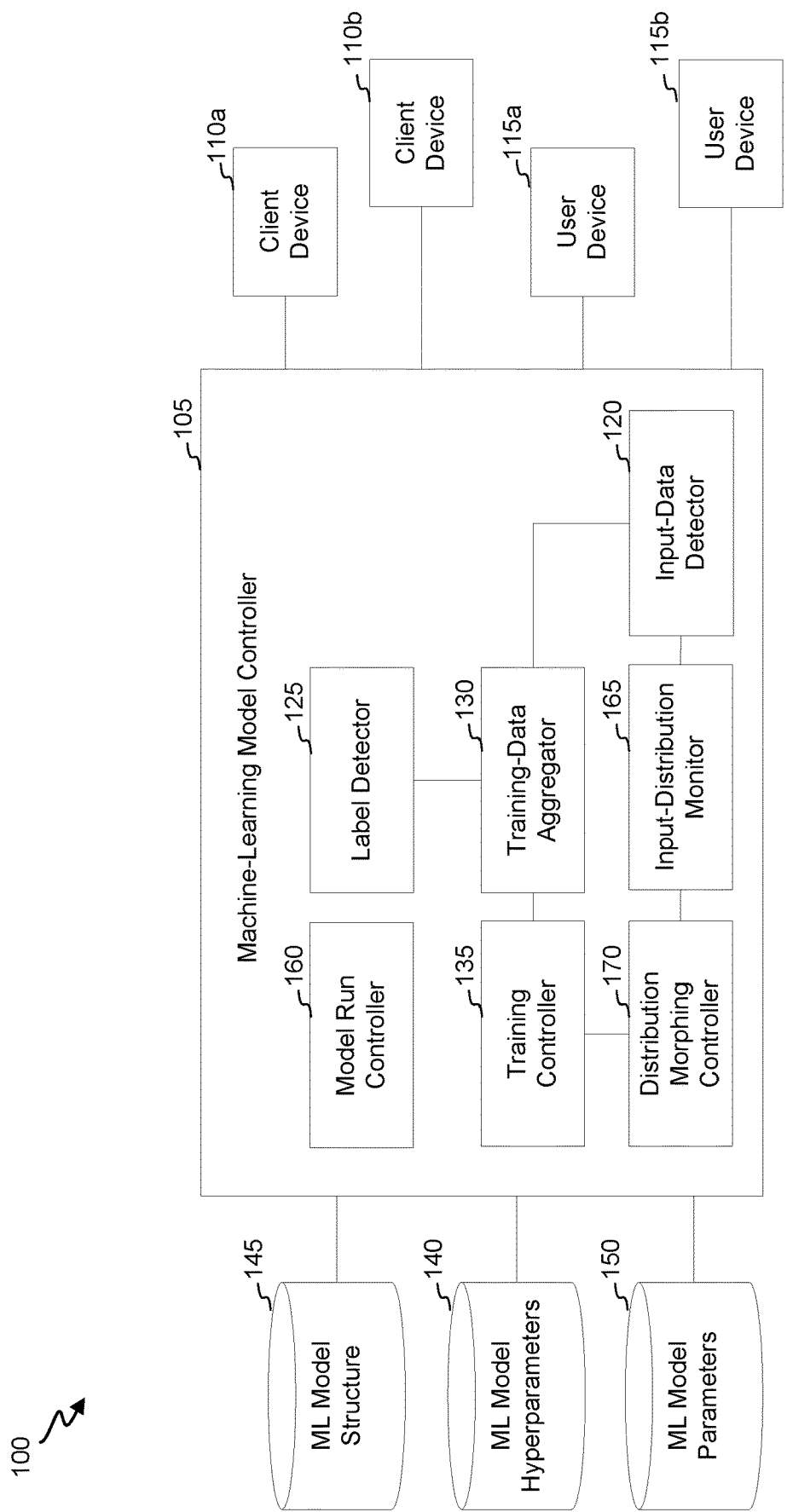
FIG. 1 shows a block diagram of a machine-learning-based processing environment according to some embodiments of the invention.

FIG. 1 shows a block diagram of a machine-learning-based processing environment 100 according to some embodiments of the invention. A machine-learning model controller 105 can be configured to train, avail, evaluate and/or update a machine-learning model. The machine-learning model may be trained, availed evaluated, updated and/or used for one or more clients, associated with a first client device 110a and a second client device 110a. The data processed by the machine-learning model may include data received from and/or detected at one or more user devices 115a, 115b. Part or all of machine-learning model controller 105 may be remote from client devices 110a, 110b and user devices 115a, 115b (e.g., and contained within a remote computing system or cloud computing system), and/or part or all of machine-learning model controller 105 may be contained within a client device 110 or user device 115. For example, a remote server may initially collect data from user devices 115 and train a machine-learning model. Code for the trained model and for monitoring for different input-data distributions can then be sent to a client device 110, which can perform the monitoring based on user data being collected at the client system. Upon detecting a different input-data distribution, the client device may execute code to update the model.

In some instances, the machine-learning model is trained, availed, evaluated and/or updated for a particular client, such that (for example) model parameters that are sent to a first client device 110a are different than those sent to a second client device 110b, or such that results that are sent to first client device 110a are generated using a model parameters different than other model parameters used to generate results sent to second client device 110b. In some instances, a model's training, input-distribution monitoring and/or retraining is performed such that a result (e.g., initial or updated parameters) is availed to multiple clients.

Machine-learning model controller includes an input-data detector 120 that receives and/or retrieves input data that includes a set of input data elements. The input data elements can include data elements to be used in a training data set to train a machine-learning model; data elements to be evaluated to determine whether a distribution of a given input data set is sufficiently similar to those in a training data set and/or data elements to be processed by a trained machine-learning model. An input data element can include (for example) a single value (e.g., numeric value or categorical value), a set of values (e.g., multiple key-value pairs and/or a set of event representations), a vector, and/or an array. An input data element may be collected (for example) by detecting user inputs received at a user device 115 (or client device 110), detecting data collected by a sensor of a user device 115, extracting information from a communication received from a user device 115 (e.g., representing a webpage request or webpage interaction), etc. In some instances, an input data element may include data values from a record (e.g., user-specific record) managed at a client device.

A label detector 125 can receive or retrieve a label for each input data element in the training data set. The label may include (for example) a numeric value or categorical value. The label may be detected by detecting a user input received at a user device 115 (or client device 110), detecting data collected by a sensor of a user device 115, extracting information from a communication received from a user device 115 (e.g., representing a webpage request or webpage interaction), etc. For example, a label may identify a location of a user device 115, an amount of time spent using a given application, whether a particular type of item was purchased through a webpage, etc. In some instances, information represented by a label represents an occurrence (or lack thereof) or state at a time point that is after one or more other time points associated with a corresponding input data element.

A training-data aggregator 130 defines a training data set to include a particular set of input data elements and a particular corresponding set of labels. Thus, each input data element in the training data set can include a corresponding label. The training data set may be associated with a given time period, a given client, a given web site, a given type of device, etc.

A training controller 135 can use the training data to train a machine-learning model. More specifically, training controller 135 may retrieve a set of model hyperparameters 140 and a model structure 145 that may have been defined based on input from an administrator device. For example, the machine-learning model can include a decision-tree model, regression model, a support vector machine, or a random-forest model. Hyperparameters may identify a number of leaf nodes in a decision tree, a depth of a decision tree, a constraint on branching to be imposed for a decision tree, a number of decision trees in a forest, variables defining a kernel that maps observations into a feature space for a support vector machine, a tolerance or penalty for a support vector machine, a learning rate, a regularization term, etc. The model structure may identify a type of model, a number of input variables, types of input variables, a number of features, etc.

Training controller 135 can process the training data to learn a set of model parameters 150. Parameters may include an identification of particular variables and/or criteria used to split each node, variables defining a hyperplane for a support vector machine, coefficients for a regression model, etc. The training can be conducted using an optimization algorithm or by identifying one or more metrics by which to identify model parameters (e.g., Gini impurity, information gain or variance reduction).

It will be appreciated that, in some instances, other types of features may be leveraged to predict whether a training data set is insufficiently representative of a current (e.g., production data set). For example, KL divergence for a specific dimension or distribution-divergence measures such as Wasserstein and Maximum Mean Discrepancy may be used.

FIG. 1 depicts data stores 140, 145 and 150 as being separate from machine-learning model controller 105. It will be appreciated that the data stores need not be remote from machine-learning model controller 105. For example, a single computing system may include part or all of one, more or all of the data stores and machine-learning model controller 105.

In some instances, once trained, the machine-learning model is then availed for use. For example, the hyperparameters, the parameters, and information pertaining to the model structure may be transmitted to a client device 110 for use, such that a model run controller 160 can execute code to configure and run the model on locally accessible data. As another example, a model run controller 160 operating within machine-learning model controller 105 may collect and/or receive input data elements from a client device 110 and/or one or more user devices 115 and process the input data elements to generate corresponding outputs. The outputs may be transmitted to a client device 110 and/or one or more actions corresponding to the outputs can be initiated (e.g., to trigger presentation of particular application content, webpage-content, emails, text messages and/or alerts).

An input-distribution monitor 165 can compare one or more characteristics of input data elements from the training set to one or more characteristics of other input data elements not represented in the training set. The other input data elements can correspond to (for example) data elements collected during a different (e.g., later) time period, corresponding to different users, corresponding to different user devices, corresponding to different websites, corresponding to different applications, corresponding to different clients and/or corresponding to different user characteristics as compared to data elements in the training data set. Such differences may, but need not, be recognized prior to comparing input-data-element characteristics.

The one or more characteristics that are being compared can include one or more characteristics of a distribution of the input data elements. The distribution may be a single-dimension distribution or a multi-dimension distribution. It may, or may not, be known that one or both of the distributions being compared is a normal distribution. In some instances, it is known or suspected that one or both of the distributions being compared is not a normal distribution.

In some instances, each distribution is fit, and the comparison includes comparing the fits of the distribution. In some instances, the comparison involves identifying the normalized overlap between the two distributions (e.g., or smoothed versions thereof) and comparing the overlap to a threshold.

In some instances, another machine-learning model is used to compare the distribution characteristics. The other machine-learning model can include a classifier. The classifier can be configured to transform an individual data element to an output corresponding to a prediction as to whether the input data element was from a distribution of input data elements from a training data set as opposed to a distribution of input data elements from a non-training data set (or the reverse). It may be inferred that the two distributions are similar if the classifier is unable to predict (e.g., to a particular and/or pre-identified degree) the distributions corresponding to individual data elements.

For example, an output of the classifier may include a probability that individual data element corresponds to a the distribution of input data elements from the training data set. A receiver-operator curve (ROC) can then be generated so as to illustrate the true positive rates versus the false positive rates across a spectrum of thresholds for the probabilities. An area under the ROC (AUROC) equal to 0.5 can indicate that the distributions are indistinguishable to the classifier. An AUROC equal to 1.0 can indicate that the distributions are perfectly distinguishable. If it is determined that the distributions are not sufficiently distinguishable, subsequent and/or maintained use of the trained machine-learning model can be facilitated. For example, input data elements can be processed and/or use authorizations can be set or transmitted.

In some instances, it may be determined that the distributions are sufficiently distinguishable when an AUROC (e.g., generated based on the input data elements from all or part of the training data set and/or based on the input data elements from all or part of the non-training data set) is above a pre-determined threshold. The pre-determined threshold may be (for example) approximately 0.55, approximately 0.6, approximately 0.7, approximately 0.75 or approximately 0.8. The pre-determined threshold may be (for example) a value that is greater than or equal to 0.55 or greater than or equal to 0.6.

If it is determined that the distributions are sufficiently distinguishable, the machine-learning model can be modified. A distribution morphing controller 170 can determine whether the distribution of the training input data elements can be morphed to correspond to the distribution of the non-training input data elements. The morphing can include applying a set of weights, such that individual weights are applied to different portions of the training input data elements. In some instances, there are constraints as to what weights can be applied, which may depend on a number or fraction of input data elements from the training data set that correspond to a given portion of the input space. Thus, for example, a morphed portion of a distribution may be effectively capped or restrained when no training-set input data elements are within the portion, when a relatively or absolutely small number of data elements in the training set are within the portion and/or when a variability or range of values of the data elements from the training set within the range is small (e.g., below a predefined threshold.

Distribution morphing controller 170 can process some or all of the input data elements in the training data set and/or some or all of the input data elements in the non-training data set to determine whether a morphed version of the training input data set can be distinguished from the non-training input data set. For example, a classifier can process each of a set of individual data elements and generate an output corresponding to a prediction as to whether the input data element was from a distribution of input data elements from a training data set as opposed to a distribution of input data elements from a non-training data set (or the reverse). The output can include a probability that a given input data element corresponds to the training distribution. Distribution morphing controller 170 can multiply the probability by a weight associated with the input data element. For example, if the initial output identifies a 20% probability that a data element is from the training distribution, distribution morphing controller 170 can look up a weight that indicates that, for a bin corresponding to the input data element, the probability is to be multiplied by two. Thus, the morphed output can be defined as a 60% probability. An ROC can be defined based on the morphed probabilities, and an AUROC can be identified based on the ROC. The AUROC can be compared to a threshold (e.g., a same threshold used to determine whether distributions of the training input data set and non-training data sets were distinguishable) to determine whether the morphed distribution is distinguishable from the distribution of the non-training input data elements.

If it is determined that the morphing causes the distributions to be sufficiently indistinguishable, model run controller 160 can implement the morphing. For example, a morphing weight for a given input data element can be identified based on a function or look-up table, and an output probability generated by a machine-learning model can be multiplied by the morphing weight.

If it is determined that the morphing does not cause the distributions to be insufficiently indistinguishable, training controller 135 can initiate retraining of the machine-learning model. In some instances, training controller 135 can identify one or more parts of an input space that are underrepresented (e.g., by a predefined degree) in the non-training data set relative to representation in the training data set. Training controller 135 can then request and/or collect labels corresponding to the under-represented parts of the input space (e.g., from a client device 110 and/or from one or more user devices 115), and the machine-learning model can be retrained so as to generate a new set of parameter values. In instances where training controller 135 and model run controller 160 are operating in different systems (e.g., a client system and a remote computing system), the new set of parameter values can be transmitted to the system operating model run controller 160.

In some instances, where a machine-learning model is executing and/or evaluated for a particular user device, user input can be collected to further facilitate assessment and/or retraining of the model. For example, an output can request input to confirm (or correct) label predictions corresponding to particular input data elements (e.g., that are represented in the non-training data set moreso than in the training data set and/or for which a classifier output high confidence in its prediction that the data element(s) were from the non-training data set).

Figure 2:
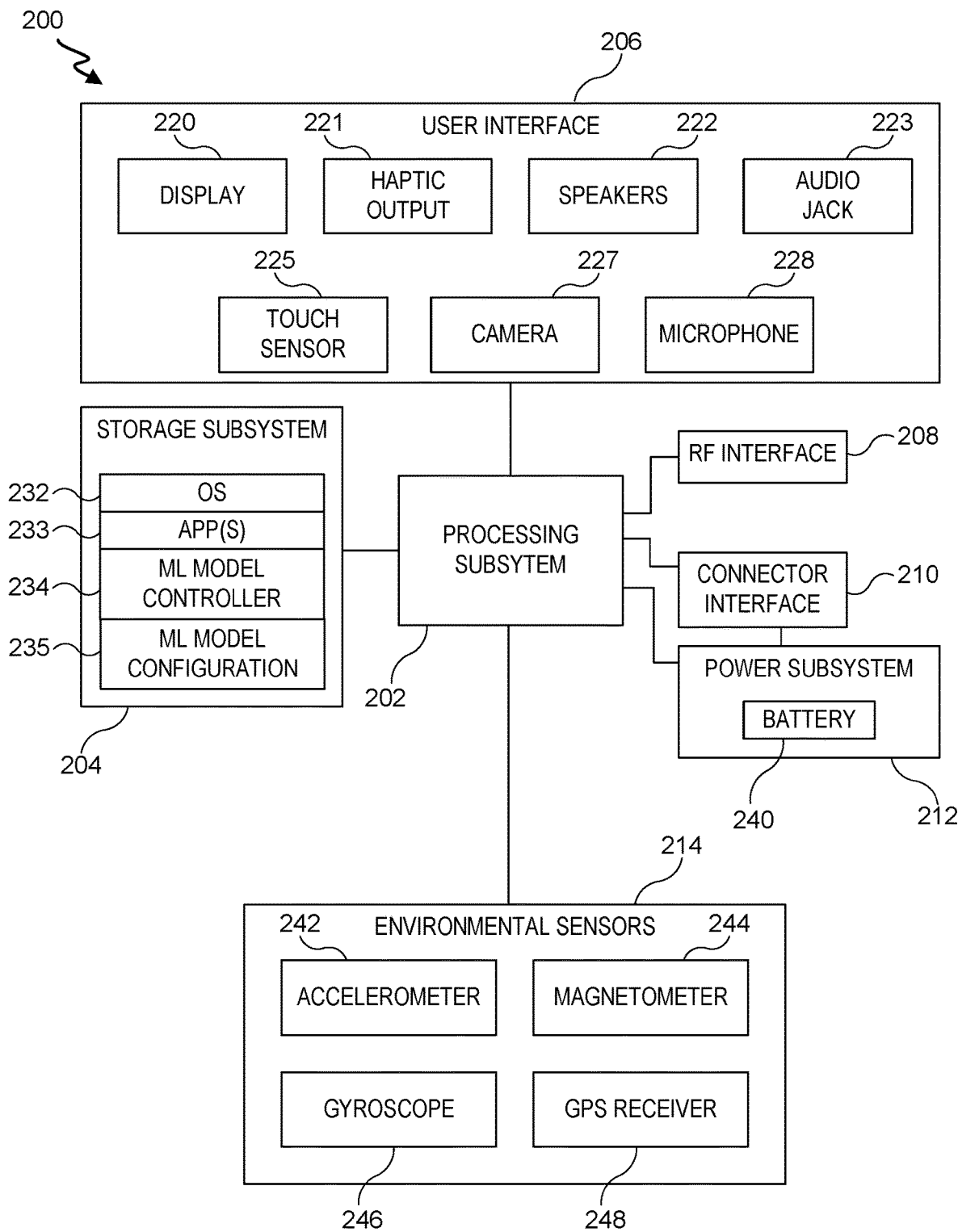
FIG. 2 shows a block diagram of a device controlling at least part of a configuration and/or use of a machine-learning model according to some embodiments of the invention.

FIG. 2 shows a block diagram of an electronic device 200 controlling at least part of a configuration and/or use of a machine-learning model according to some embodiments of the invention. Electronic device 200 can include a processing subsystem 202, a storage subsystem 204, a user interface 206, a transceiver subsystem 208, a power subsystem 212 and environmental sensors 214.

Processing subsystem 202 can be implemented as one or more integrated circuits, e.g., one or more single-core or multi-core microprocessors or microcontrollers, examples of which are known in the art. In operation, processing subsystem 202 can control the operation of electronic device 200. In various embodiments, processing subsystem 202 can execute a variety of programs in response to program code and can maintain multiple concurrently executing programs or processes. At any given time, some or all of the program code to be executed can be resident in processing subsystem 202 and/or in storage media such as storage subsystem 204.

Through suitable programming, processing subsystem 202 can provide various functionality for electronic device 200. For example, processing subsystem 202 can execute code to facilitate analyzing one or more signals received at the device to infer whether any antenna(s) are obstructed. The code execution can further include, upon inferring an obstruction, identifying which antenna(s) are obstructed and triggering a change (e.g., a temporary change) in an operation of electronic device 200.

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media.

In some embodiments, storage subsystem 204 can store code or instructions for an operating system 222 and/or one or more application programs (or apps) 223 to be executed by processing subsystem 202. Storage subsystem 204 can store machine-learning model controller code 234 that may include code that corresponds to one, more or all of the components of machine-learning controller 105 depicted in FIG. 1. Machine-learning model controller code 234 may collect and/or process data detected locally (e.g., via local inputs) and/or received from another device to identify individual input data elements. Machine-learning model controller coder 234 may further, with respect to each of some or all of the individual input data elements, collect and/or process data detected locally and/or received from another device to identify a label for the input data element. A training data set can be defined to include a first set of input data elements and a corresponding set of labels.

Machine-learning model controller code 234 can use the training data set to train a machine-learning model. The trained machine-learning model can be defined via a machine-learning model configuration 235, which can include a structure of a machine-learning model, one or more hyperparameters, one or more learned parameters, and code to process individual input data elements using a model having the structure and configured with the parameters. In some instances, rather than locally training the machine-learning model, initial learned parameters (e.g., and the model structure and hyperparameters) are received from another device or system.

Another set of input data elements can be identified based on data detected locally or received from another device. The other set of input data elements may be unlabeled. Machine-learning model controller code 234 can use another machine-learning model (e.g., a classifier) to determine whether distributions of the set of input data elements and of the other set of input data elements can be distinguished to a defined degree. For example, an accuracy metric of classifications that exceeds a predefined threshold can indicate that the distributions are distinguishable.

If the distributions are distinguishable, machine-learning model controller code 234 can determine whether a morphing can be applied to an input space in the training-data context to make the distribution of morphed input data elements from the training data set substantially indistinguishable from a distribution of input data elements from the non-training data set. The morphing can include applying a morphing function along a continuum of input data element values and/or using a set of morphing weights to be applied to corresponding bins of input data element values. If the morphing results in the distributions no longer being sufficiently distinguishable, the machine-learning model configuration 235 can be updated to implement the morphing.

If the distributions remain distinguishable when the morphing is used, machine-learning model controller code 234 can identify one or more portions of an input space that are represented in the other (e.g., non-training) set of input data elements but are not represented in the (e.g., training) set of input data elements or are not represented to a sufficient degree in the set of input data elements (e.g., an absolute or relative number of data elements having values within a subspace is below a threshold). Each portion of the input space may be defined based on one or more criteria that identify potential values along one or more dimensions. A criterion may include a numeric range, one or more categorical values and/or a one or more criteria assigned to a node split in an existing decision tree of the machine-learning model.

Machine-learning model controller 234 can then facilitate collecting more labeled data elements (inclusive of an input data element and a label). In some instances, machine-learning model controller 234 can identify and/or request labels for some particular data elements in the other set of input data elements. In some instances, machine-learning model controller 234 can identify and/or request labeled data elements that were not sufficiently represented in the (e.g., training) set of input data elements (but that need not correspond to particular input data elements in the set of input data elements or other set of input data elements.

For example, electronic device 200 can monitor for communications or records with content or metadata that correspond to an input-space portion and then identify a corresponding label (e.g., using a same or different communication or record or requesting that a user or other device identify the label. As another example, electronic device 200 can send a communication to another device or present a presentation that requests additional labeled data corresponding to the input-space portion.

Upon gaining access to the additional labeled data, machine-learning model controller 234 can retrain the machine-learning model, which can generate an updated set of parameters. In some instances, the additional labeled data is combined with some or all of the initial training data set, and the model is trained using the combined data set. A morphing may then be applied (e.g., if it is determined that a distribution of the input data elements from the combined data set remains sufficiently distinguishable from the distribution of the other set of input data elements).

Transceiver subsystem 208 can allow electronic device 200 to transmit signals, receive signals and/or communicate wirelessly with various electronic devices. Transceiver subsystem 208 can include a component, such as an antenna and supporting circuitry to enable data communication over a wireless medium, e.g., using near-field communication (NFC), Bluetooth Low Energy, Bluetooth® (a family of standards promulgated by Bluetooth SIG, Inc.), Zigbee, Wi Fi (IEEE 802.11 family standards), or other protocols for wireless data communication. In some embodiments, transceiver subsystem 208 can implement a proximity sensor that supports proximity detection (e.g., via NFC or Bluetooth Low Energy) through a detection of a signal, estimation of signal strength and/or other protocols for determining proximity to another electronic apparatus.

Transceiver subsystem 208 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into transceiver subsystem 208. In some instances, a same component of transceiver subsystem 208 can serve to receive incoming signals and transmit outgoing signals. In some instances, different components handle incoming and outgoing signals.

In some embodiments, electronic device 200 includes a power subsystem 212 that can provide power management capabilities and power for electronic device 200. Power subsystem 212 can include circuitry to distribute received, converted and/or stored power to other components of electronic device 200 that require electrical power.

In some (but not other instances), power subsystem 212 can include a battery 240 (e.g., a rechargeable battery) and can also include circuitry operable to charge battery 240. Thus, in some embodiments, power subsystem 212 can include a "wireless" charger, such as an inductive charger, to charge battery 240. This capability can be used to extend a time during which electronic device 200 can transmit data (e.g., such that data can be transmitted even when it is not sufficiently close to be powered by a nearby electronic device) and/or can allow electronic device 200 to communicate using a different communication protocol and/or over a larger range.

In some embodiments, power subsystem 212 can control power distribution to components within electronic device 200 to manage power consumption efficiently. For example, power subsystem 212 can automatically place electronic device 200 into a "hibernation" or "sleep" state when it is determined or inferred that no electronic device is nearby (e.g., due to a lack of incoming signals). The hibernation or sleep state can serve to inhibit or pause outgoing transmissions of data. In some instances, a device is also in a "locked" state while it is in a hibernation or sleep state and a normal-operation state, in that biometric data or character passcode that matches a stored unlocking data is required to unlock the device and avail basic device features (e.g., use of primary functions of multiple apps, email apps, ability to place a non-emergency call, etc.).

Power subsystem 212 can also provide other power management capabilities, such as regulating power consumption of other components of electronic device 200 based on the source and amount of available power, monitoring stored power in battery 240, and so on.

In some embodiments, control functions of power subsystem 212 can be implemented using programmable or controllable circuits operating in response to control signals generated by processing subsystem 202 in response to program code executing thereon, or as a separate microprocessor or microcontroller. Power subsystem 212 can be configured to detect whether a power source is a battery or another source (e.g., an AC source). Power subsystem 212 can be configured to detect whether (or when) electronic device 200 is charging and/or connecting to a physical charging element (e.g., a charging cord).

User interface 206 can include any combination of input and output devices. In some instances, a user can operate input devices of user interface 206 to invoke the functionality of electronic device 200 and can view, hear, and/or otherwise experience output from electronic device 200 via output devices of user interface 206. Examples of input devices include microphone 228, touch sensor 225, and camera 227. Examples of output devices include display 220, speakers 222, and haptic output generator 221.

Microphone 228 can include any device that converts sound waves into electronic signals. In some embodiments, microphone 228 can be sufficiently sensitive to provide a representation of specific words spoken by a user; in other embodiments, microphone 228 can be usable to provide indications of general ambient sound levels without necessarily providing a high quality electronic representation of specific sounds.

Camera 227 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by electronic device 200 to other devices for storage. Depending on implementation, the optical components can provide fixed focal distance or variable focal distance; in the latter case, autofocus can be provided. In some embodiments, camera 227 can be disposed along an edge of a face member of a device, e.g., the top edge, and oriented to allow a user to capture images of nearby objects in the environment such as a bar code or QR code. In other embodiments, camera 227 can be disposed on the front surface of a device face member, e.g., to capture images of the user. Zero, one, or more cameras can be provided, depending on implementation.

Touch sensor 225 can include, e.g., a capacitive sensor array with the ability to localize contacts to a particular point or region on the surface of the sensor and in some instances, the ability to distinguish multiple simultaneous contacts. In some embodiments, touch sensor 225 can be overlaid over display 220 to provide a touchscreen interface, and processing subsystem 202 can translate touch events (including taps and/or other gestures made with one or more contacts) into specific user inputs depending on what is currently displayed on display 220. In some instances, user interface 206 includes a keyboard that detects mechanical inputs corresponding to keystrokes, a mouse that detects cursor movements or mouse clicks and/or a touch pad.

Display 220 can be implemented using compact display technologies, e.g., LCD (liquid crystal display), LED (light emitting diode), OLED (organic light emitting diode), or the like. In some embodiments, display 220 can incorporate a flexible display element or curved glass display element, allowing electronic device 200 to conform to a desired shape. One or more speakers 222 can be provided using small form factor speaker technologies, including any technology capable of converting electronic signals into audible sound waves. In some embodiments, speakers 222 can be used to produce tones (e.g., beeping or ringing) and can but need not be capable of reproducing sounds such as speech or music with any particular degree of fidelity. Haptic output generator 221 can be, e.g., a device that converts electronic signals into vibrations; in some embodiments, the vibrations can be strong enough to be felt by a user wearing electronic device 200 but not so strong as to produce distinct sounds.

In some embodiments, user interface 206 can provide output to and/or receive input from an auxiliary device such as a headset. For example, audio jack 223 can connect via an audio cable (e.g., a standard 2.5-mm or 2.5-mm audio cable) to an auxiliary device. Audio jack 223 can include input and/or output paths. Accordingly, audio jack 223 can provide audio to the auxiliary device and/or receive audio from the auxiliary device. In some embodiments, a wireless connection interface can be used to communicate with an auxiliary device.

In some instances, one or more input data elements and/or one or more labels may include data corresponding to input detected by an input device of user interface 206 or may include information determine based on input detected by an input device of user interface 206. For example, an input data element may identify voice commands received at microphone 228 or may identify webpage-browsing patterns identified based on inputs received by touch sensor 225. As another example, a label may indicate whether a user accepted a suggested application function.

One or more output devices of user interface 206 may be used to present a stimulus determined based on an output generated by the machine-learning model. For example, content of an alert or content of a webpage may be selected based on the model's output and presented. In some instances, one or more output devices of user interface 206 presents a stimulus indicating whether a distribution of a given set of input data elements is sufficiently distinguishable from a training set, whether a morphing can resolve the distinction, whether model retraining is recommended and/or whether new labels are requested. An input device may receive input that corresponds to an authorization to (for example) use a previously trained machine-learning model in a new context or time period, apply a morphing, retrain the model and/or collect new labels.

In some instances, electronic device 200 includes one or more environmental sensors 214, such as one or more electronic, mechanical, electromechanical, optical, or other devices that provide information related to internal external conditions around electronic device 200. Environmental sensors 214 in some embodiments can provide digital signals to processing subsystem 202, e.g., on a push (e.g., streaming or regular-communication) basis or in response to polling by processing subsystem 202 as desired. Any type and combination of sensors can be used; shown by way of example are an accelerometer 242, a GPS receiver 248, a gyroscope 246 and a magnetometer 244. One or more of environmental sensors 214 (e.g., accelerometer 242, GPS receiver 248, gyroscope 246 and magnetometer 244) can be configured to detect information about a motion and/or location of electronic device 200.

Accelerometer 242 can detect an acceleration of electronic device 200 (e.g., generally or in each of one or more directions). For example, accelerometer 242 can include a three-axis or six-axis accelerometer. Accelerometer data can identify (for example) an acceleration experienced along each of one or more (e.g., three or six) axes and can further identify an orientation of electronic device 200. GPS receiver 248 can receive communications from multiple GPS satellites and estimate a location of electronic device 200. It will be appreciated that other sensors can also be included in addition to or instead of these examples.

Gyroscope 246 can include, for example, a MEMS gyroscope that detects an orientation of electronic device 200. For example, gyroscope 246 can identify an angular position of electronic device 200 along one or more (e.g., three) axes.

Magnetometer 244 can be configured to measure characteristics of a magnetic field. Such characteristics can be used to identify geospatial directions (e.g., identifying which direction, relative to electronic device 200) is north. It will be appreciated that electronic device 200 can alternatively or additionally include one or more additional types of sensors, such as a barometer that can be used to detect altitude data and/or a light sensor that can detect ambient light levels.

In some instances, one or more input data elements and/or one or more labels may include data from one or more environmental sensors 214 or may include information determined based on data from one or more environmental sensors. For example, an input data element may identify a time and a location (e.g., detected using GPS receiver 248) of electronic device 200. As another example, an input data element may identify a cumulative motion of electronic device 200 over a time period based on signals detected by accelerometer 242.

While the electronic device 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including devices implemented using any combination of circuitry and software. It is also not required that every block in FIG. 2 be implemented in a given embodiment of an electronic device.

Various components of electronic device 200 may be included in (for example) a client device, user device, remote computing system, system operating all or part of a machine-learning model controller and/or administrator device. For example, a user device may include part or all of user interface 206 and/or environmental sensors 214 configured to collect data for input data elements, a remote computing system may include machine-learning model controller 234, and a client device may include machine-learning model configuration 235 and part or all of user interface 206 (e.g., to authorize various modifications or uses of a machine-learning model and to output generated labels).

Figure 3:
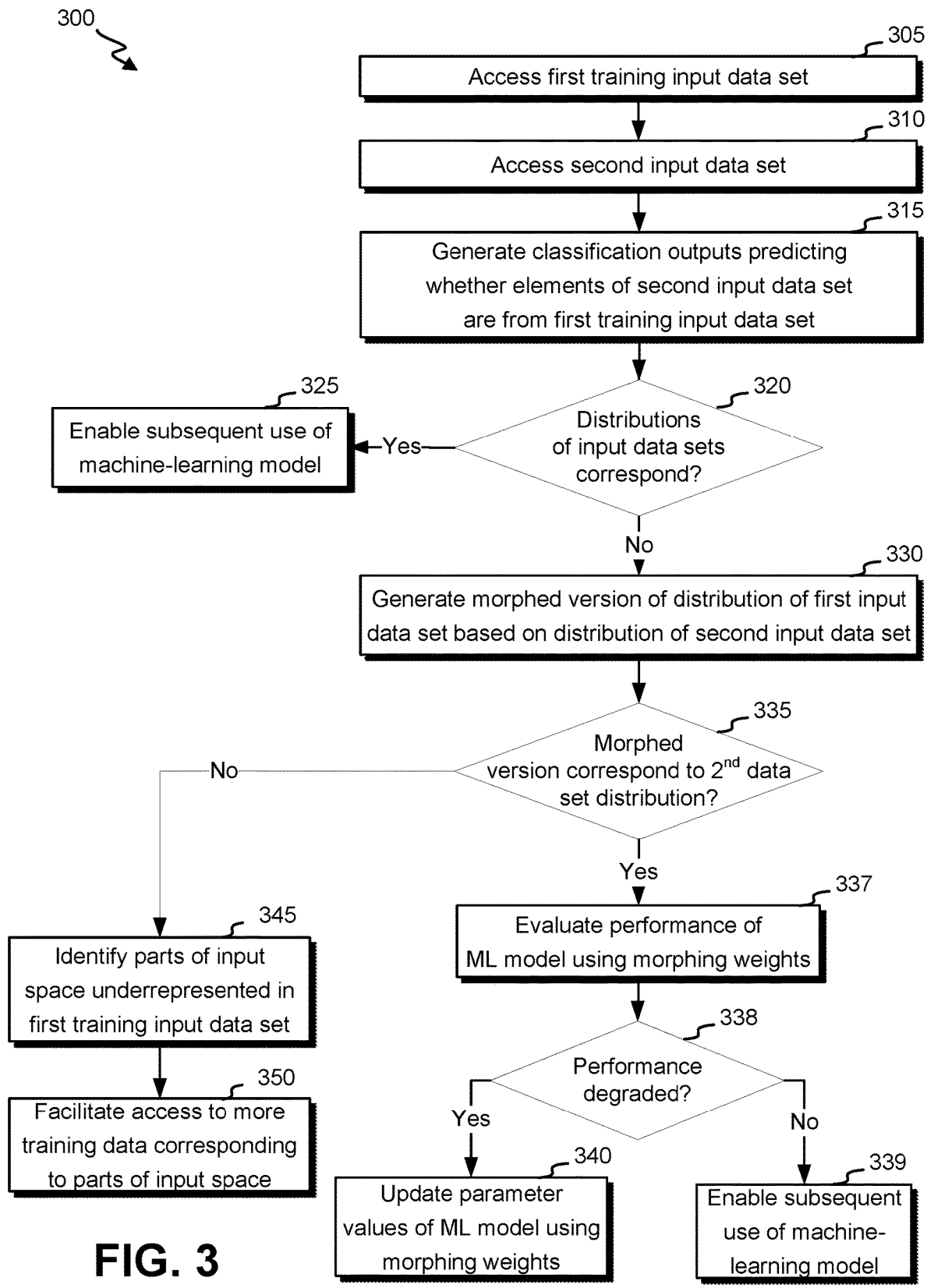
FIG. 3 illustrates a flowchart of a process for assessing input data sets to conditionally trigger updates to a machine-learning model.

FIG. 3 illustrates a flowchart of a process 300 for assessing input data sets to conditionally trigger updates to a machine-learning model. Process 300 begins at block 305 where a first training input data set is accessed. The first training input data set can include multiple first input data elements and, for each of the first input data elements, a corresponding label. The first training input data set can be used to train a machine-learning model. Training the machine-learning model can include learning a set of parameter values, such as one or more weights, thresholds, variable selections, penalties, and so on. The machine-learning model can include (for example) decision-tree model, regression model, a support vector machine, a random-forest model, or a neural network. Each of the multiple first input data elements can be one-dimensional or multi-dimensional. Each of the multiple first input data elements can include values for one or more fields and/or one or more variable types.

At block 310, a second input data set is accessed. The second input data set can include multiple second input data elements. Each of the multiple second input data elements can be one-dimensional or multi-dimensional and may have a say dimensionality as each of the multiple first input data elements. Each of the multiple second input data elements can include values for one or more fields and/or one or more variable types and may include values for same fields (or at least one of the same fields) and/or for same variable types (or at least one of the same variable types) as included in the multiple first data elements.

At block 315, a classification output is generated for each input data element of the multiple first input data elements and for each of the multiple second input data elements. Each classification output correspond to a prediction as to whether the input data element is a sample from the first training input data set (e.g., versus the second input data set). For example, each classification output can include an estimated probability that the input data element is a sample from the first training input data set or a binary prediction as to whether the input data element is a sample from the first training input data set. The classification output can be generated using another machine-learning model.

At block 320, it can be determined whether a distribution of the multiple first input data elements sufficiently corresponds to a distribution of the second input data set based on the classification outputs. The determination can include generating a receiver-operator curve (ROC) based on probabilistic classification outputs, and comparing an area under the ROC (AUROC) to a predefined threshold. If the AUROC is above the threshold, the distributions can be deemed to be distinguishable. If the AUROC is below the threshold, the distributions can be deemed to be indistinguishable. The determination can include comparing a single probability or a percentage of binary outputs representing correct distribution estimates to a predefined threshold.

When it is determined that the distribution of the first training input data set does not sufficiently correspond to the second input data set, process 300 can proceed to block 325 where subsequent use of the machine-learning model can be enabled. For example, a remote server that manages execution of a machine-learning model can process one or more input data elements (e.g., identified based on one or more communications received from one or more client and/or user devices) and return a result to a client device based on the machine-learning model (e.g., as opposed to not transmitting any communication to the client device and/or transmitting an error to the client device). As another example, a local iteration of code to run a machine-learning model may operate as a background operation when it is determined that distributions of the input data sets sufficiently correspond, while a different technique (e.g., use of a static rule) may be in used in at least some instances when it is determined that distributions of the input data sets do not sufficiently correspond (e.g., and when morphing is insufficient to transform a distribution of one input data set to sufficiently correspond with a distribution of the other input data set.

When it is determined that the distribution of the first training input data set does sufficiently correspond to the second input data set, process 300 can proceed to block 330, where a morphed version of a distribution of the first training input data set is generated based on the distribution of the second input data set. The morphed version may be generated by applying, to each of some or all of the multiple input data elements in the first training input data set, a morphing weight. The morphing weight may be determined based on a quantity or fraction of input data elements in the second input data set that are the same as the first set's input data element or that are within a same subspace of an input space as the first set's input data element. The number or fraction may be normalized based on a corresponding number of fraction of input data elements in the second input data set that are the same as the first set's input element or that are within a same subspace of an input space as the first set's input data element. To illustrate, in an instance where the input data elements have a single dimension, a weight applied to a first training input data element having a value of 5 (along the first dimension) may be 3 when there are a total of two first input data elements in the first training input data set with a value of 5 but are a total of six second input data elements in the second training input data set with a value of 5.

In some instances, morphing weights are determined based on a morphing function. For example, each of a distribution of the first training input data set and a distribution of the second input data set may be fit to a particular type of function (e.g., polynomial function of a given order, a fit based on a particular type of regression, etc.). In some instances, a weighting function is defined as a particular type of function that achieves some type of defined optimization (e.g., minimizes cumulative error) when comparing a product of the weighting function and the fit of the distribution of the first training input data set to the distribution of the second input data set. In some instances, the weighting function is defined such that a dot product of the weighting function and the fit of the distribution of the first training input data set is equal to the fit of the distribution of the second input data set.

At block 335, it is determined whether the morphed version of the distribution of the first training input data set sufficiently corresponds to the distribution of the second input data set. In some instances, a classifier (e.g., of a same type used at block 315) is used at block 335. For example, the classifier may generate an output corresponding to a probability that a given input data element is from the morphed version of the distribution of the first training input data set (e.g., as compared to from the distribution of the second input data set). As another example, the classifier may generate an output predicting a probability that a given input data element is from the first training input data set, and the probability may then be modified based on a weight corresponding to a value of the input data element (e.g., by multiplying the probability by the morphing weight and potentially applying an upper cap of 100% and a lower limit of 0%). A performance metric (e.g., an AUROC) can be calculated based on the probabilities (or weighted probabilities) and compared to a threshold. When the AUROC is above the threshold, it may be determined that the morphed version of the distribution of the first training input data set remains sufficiently distinguishable from the distribution of the second input data set.

In some instances, a performance-metric statistic is generated based on a comparison of the distributions, and block 335 includes comparing the statistic to a predetermined threshold. For example, it may be determined that the morphed version of the distribution of the first training input data set sufficiently corresponds to the distribution of the second input data set when an integral of a difference between the distributions is below a threshold. As another example, it may be determined that the morphed version of the distribution of the first training input data set sufficiently corresponds to the distribution of the second input data set when an error or normalized cumulative difference generated based on comparisons of individual bins within the distributions is below a threshold.

If it is determined that the morphed version of the distribution of the first training input data set sufficiently corresponds to (e.g., is not sufficiently distinguishable from) the distribution of the second input data set, process 300 continues to block 337, where performance of the machine-learning model configured with the morphing weights is evaluated. More specifically, the performance monitoring can be performed so as to estimate how the model performs when processing input data from the second data set. However, the second data set may lack labels. Thus, to obtain this estimate, the model may be tested using at least some of the labeled data from the first training data set, but the morphing weights may be used such that various input data element-label pairs are weighted more heavily than others. For example, if a first half of the input data elements from the first training data set include: "Time of day: Day" and a second half include "Time of Day: Night", but all of the input data elements from the second data set include: "Time of day: Day", the performance evaluation may be based only on the first half of the input data elements and corresponding labels from the first training data set. The performance may be evaluated by calculating (for example) an accuracy, sensitivity, specificity and/or AUROC statistic based on predictions generated by the model and based on labels.

At block 338, it can be determined whether the performance has degraded. The assessment may be performed by comparing the performance of the model when effecting the morphing weights to the performance of the model when not effecting the morphing weights. For example, a first assessment of the model may evaluate one or more validation and/or testing data sets that were pseudo-randomly selected from the first training data set and for which individual predictions were equally weighted. Meanwhile, an assessment performed at block 337 may define a validation and/or testing data set by selecting data points from the first training data set using a weighted distribution (corresponding to the morphing weights) and/or by effecting the morphing weights when aggregating individual data-point indications as to whether and/or an extent to which predictions matched labels.

It may be determined that performance degraded if (for example) a performance statistic associated with the block-337 evaluation was at least a predefined (relative or absolute) amount lower than a performance statistic calculated without using the morphing weights. For example, the predefined amount may be 10%, 20%, 25%, 33% or 50%. If it is determined that the performance did not sufficiently degrade, subsequent use of the machine-learning model (not configured with the morphing weights) can be enabled at block 339.

If it is determined that the performance did sufficiently degrade, process 300 can proceed to block 340, where a set of parameter values of the machine-learning model is updated based on morphing weights. The updated set of parameter values can also depend on at least some of the first training input data set and corresponding labels.

For example, sample weights can be applied that correspond to the morphing (e.g., such that a weight is assigned to each of the at least some of the first training input data elements). The weight can have an effect of changing feature thresholds, impurity measures and how nodes in a decision tree are split. As another example, morphing weights may have an effect of shifting densities of an input space, which can result in a different hyperplane definition. Use of the machine-learning model with the updated parameter values can then be enabled.

If it is determined that the morphed version of the distribution of the first training input data set does not sufficiently correspond to (e.g., is sufficiently distinguishable from) the distribution of the second input data set, process 300 continues to block 345, where one or more parts of an input space are identified. The one or more parts of the input space can be those that are underrepresented (e.g., by at least a predetermined degree) in a distribution of the first training input data set relative to a distribution of the second input data set. For example, the morphed version of the distribution of the first training input data set can be subtracted from the distribution of the second input data set. The one or more parts of the input space may be defined as each region for which a value or statistic (e.g., average, maximum, or median) of the region in the difference is below a threshold.

As another example, the one or more parts of the input space can be determined based on interim results generated to determine whether the morphed version of the distribution of the first training input data set sufficiently corresponds to the distribution of the second input data set. The one or more parts may be defined as particular values, value ranges and/or combinations thereof (e.g., across one or more dimensions) for which an accuracy of a classifier exceeded a threshold when predicting to which distribution individual input data elements corresponded. For example, a part of the input space may defined as a part for which a given variable had values between 50-100 if such values were determined to correspond to accurate classification results (e.g., which other variable values may have been associated with less accurate or inaccurate classification results).

At block 350, access to additional training data corresponding to the one or more parts of the input space can be facilitated. For example, a request for labels corresponding to particular input data elements in the second input data set can be generated. The particular input data elements can correspond to those in the one or more parts of the input space and/or those associated with accurate results when predicting whether they were from the morphed distribution of the first training input data set or from the distribution of the second input data set. In some instances, the request merely identifies the one or more parts of the input space. The request may be transmitted to a client device and/or locally presented. Upon receiving additional data corresponding to the one or more parts of the input space, the machine-learning model can be retrained.

Thus, in some instances, a machine-learning model M (trained using a first training input data set and corresponding labels) with a performance P is prepared for deployment, prepared for an update or prepared for maintained use. As part of the preparation, a distribution of a second input data set is compared to a distribution of the first training input data set using another model M* (e.g., a classifier). A shift in the distributions may be detected, in which case, a morphing can be identified that can transform the distribution of the first training input data set to the distribution of the second input data set. Performance of the model on the second input data set can be estimated by using at least some of the first training input data set, at least some of the labels and the morphing weights. If a sufficient performance loss is detected, the model can be retrained. In some instances, the retraining can be performed using some or all of the first training input data set, some or all of the corresponding labels and/or the morphing weights. In some instances, the retraining can be performed using other labels (e.g., and at least some of the second input data set).

It will be appreciated that various modifications to process 300 are contemplated. For example, an alert communication may be presented or transmitted in response to effecting a morphing at block 340 and/or seeking additional training data at block 350. As another example, a log of model evaluations and/or modifications may be generated so as to facilitate empirically characterizing robustness of the machine-learning model. As yet another example, statistics of morphed and/or retrained models can be determined and potentially reported to one or more clients or prospective clients.

Additionally, one or more additional criteria or evaluations may be introduced to process 300. For example, an additional assessment may be performed after block 330 that identifies a portion of the first training input data set that were associated with low morphing weights. If it is determined that the portion exceeds a predetermined threshold (e.g., 80% or 90%), process 300 may proceed to block 345 to initiate and/or facilitate retraining of the model.

Further, one or more parts of process 300 may be performed in a recursive manner and/or may amount to a recursive process. For example, the determination at block 335 as to whether the distribution of the morphed version of the first input data set sufficiently corresponds to the second data set distribution can amount to a repetition of blocks 315-320 using the morphed first training input data set in lieu of the first training input data set. If not, it may be determined whether to generate a new morphed version of the distribution of the first input data set or to proceed to block 345. For example, it may be determine to generate a new morphed version so long as a distinguishability metric (e.g., AUROC) has decreased from a previous iteration by at least a predetermined amount (e.g., 5%, 10%, 15%, 0.05, 0.1, 0.2, etc.).

Figure 4:
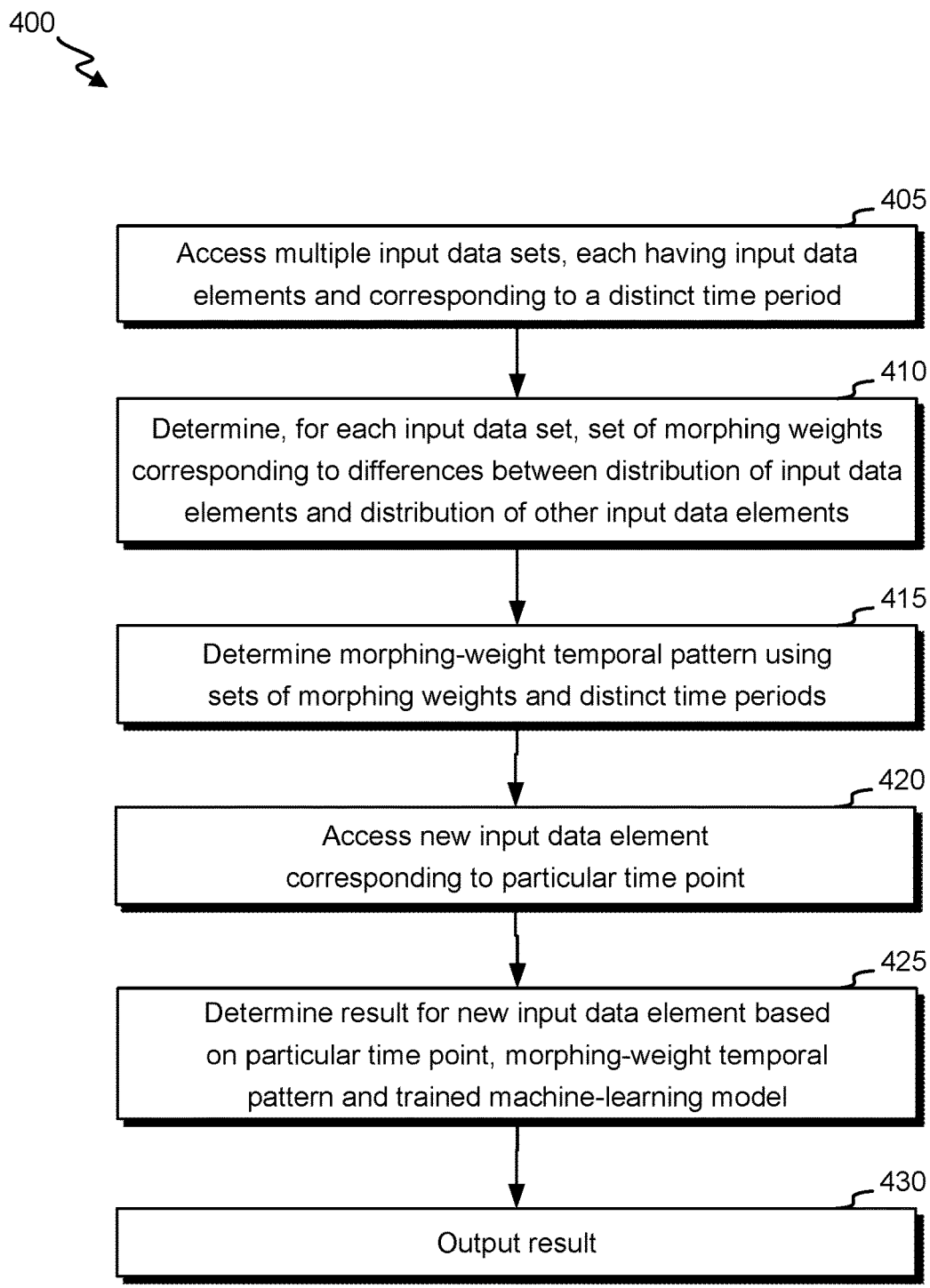
FIG. 4 illustrates a flowchart of a process for assessing input data sets to conditionally trigger updates to a machine-learning model.

FIG. 4 illustrates a flowchart of a process 400 for assessing input data sets to conditionally trigger updates to a machine-learning model. Process 400 begins at block 405 where multiple input data sets can be accessed. Each of the multiple input data sets can include multiple input data elements and can correspond to a distinct time period relative to input data elements in other of the multiple input data sets. For example, the multiple input data sets may correspond to different months of the year, different days of the week, different hours of the day, different parts of the day (e.g., morning, afternoon, evening and/or night), etc.

At block 410, for each of the multiple input data sets, a set of morphing weights can be identified. Each of the set of morphing weights can include a weight that is to be applied to a range of input-space values to transform a prevalence value (e.g., a count or frequency) from a first distribution into a morphed prevalence value (e.g., a morphed count or morphed frequency). The set of morphing weights may be determined using a technique disclosed herein. The set of morphing weights may identify relative differences between a distribution of the input data set and another baseline distribution. The other baseline distribution may be (for example) associated with input data elements from an initial training set, one or more other input data sets of the multiple data sets. The set of morphing weights may be defined to transform the distribution of the input data set into the other baseline distribution to an extent possible (e.g., in accordance with an optimization technique).

At block 415, a morphing-weight temporal pattern can be determined using the sets of morphing weights and the distinct time periods. For example, block 415 may include using the sets of morphing weights and temporal variables representing the distinct time periods to fit a function. The function may include one or more periodic terms, such as one or more sine or cosine terms. As another example, block 415 may include generating a temporal data structure that identifies morphing weights as a function of time and transforming the temporal data structure into the frequency domain. A time-based analysis (e.g., a function fit and/or Fourier transform) may be performed in multiple dimensions, so as to (for example) include one or more dimensions that indicate various parts of an input data space. Alternatively or additionally, a time-based analysis may be separately performed for each of multiple parts of an input data space.

The time-based analysis may be used to detect that morphing weights associated with particular parts of an input space are varying in a particular manner (e.g., a cyclic, periodic or sinusoidal manner). For example, it may be determined that, for a particular part of an input space and for a particular frequency band, a power of a Fourier transform generated using a time-based analysis exceeds a threshold. To illustrate, in a situation in which input data sets correspond to search queries, it may be determined that morphing weights associated with a part of an input space that corresponds to restaurants exhibit variation based both across a weekly and daily cycle. Even more specifically, an analysis of the morphing weights and time periods may indicate that queries related to restaurants are more common in the evenings as compared to the morning and more common on weekends as compared to weekdays.

Thus, a morphing-weight temporal pattern may identify or estimate, for each of one or more portions of an input space: how morphing weights associated with the input-space portion varies over time; a frequency or period of a morphing-weight modulation; a phase of a morphing-weight modulation; time points (e.g., within a modulation period) associated with relatively high or relatively low morphing weights; etc. A morphing-weight temporal pattern may identify or estimate, for each of one or more frequencies: for which portions of an input space morphing-weight modulation was observed at the frequency; an extent to which morphing weights associated with each of one or more portions of an input space were modulating at the frequency; and/or how morphing weights associated with each of one or more portions of an input space were modulating at the frequency. A morphing-weight temporal pattern may identify one or more portions within a period during which a morphing weight for an input subspace is high (or low).

In some instances, a morphing-weight temporal pattern is determined based on input data collected from multiple users and/or multiple devices. In some instances, a morphing-weight temporal pattern is determined based on input data that is associated with (for example) a particular user, particular user demographic, particular geographical area, etc.

At block 420, a new input data element can be accessed (e.g., and//or received). The new input data element can correspond to a particular time point, which may correspond to a current time.

At block 425, a result for the new input data element can be determined using the particular time point, the morphing-weight temporal pattern and a trained machine-learning model. The machine-learning model may have been trained using one or more of the multiple input data sets and/or one or more other training sets.

Block 425 can include determining whether a morphing weight is to be applied and/or to identifying a morphing weight to be applied when processing the new input data element with the machine-learning model. In some instances, it may be determined whether the particular time point is within any of one or more portions of one or more periods associated with a non-unity morphing weight. For example, if a morphing-weight temporal pattern indicates that a particular morphing weight is to be applied to a particular type of input during November-February, block 425 may include determining whether the particular time point is within November-February. As another example, if a morphing-weight temporal pattern indicates that a morphing weight for a particular type of input varies in accordance with a particular function across hours of the day, block 425 may include inputting the particular time point into the particular function to identify a morphing weight.

Parameter values of the machine-learning model can then be updated using the morphing weight(s) (e.g., as described in correspondence with block 340 of FIG. 3). A result can be generated using the machine-learning model, the updated parameter values and the new input data element. At block 430, the result can be output. Outputting the result can include presenting the result, transmitting the result and/or performing a device operation in accordance with the result.

Thus, process 400 can be used to detect input patterns indicating that different types of inputs are received during various seasons, months, days of the week, hours of the day, etc. Processing of an input data element can then be adjusted based on a time associated with the input data element and a machine-learning model.

It will be appreciated that variations of process 400 are contemplated. For example, rather than and/or in addition to determining the morphing weights at block 410, classifier outputs can be determined for each input data set. The classifier outputs can correspond to predictions as to whether input data elements are part of the input data set or another (e.g., baseline data set). In some instances, the classifier outputs are processed to determine one or more metrics for the input data set. For example, a metric can identify a percentage of the individual data points correctly classified, an average (or median) classification confidence, etc. At block 415, the temporal pattern that is determined can be based on the metrics for the multiple input data sets and distinct time period. At block 425, the result can be determined based on this temporal pattern.

Figure 5:
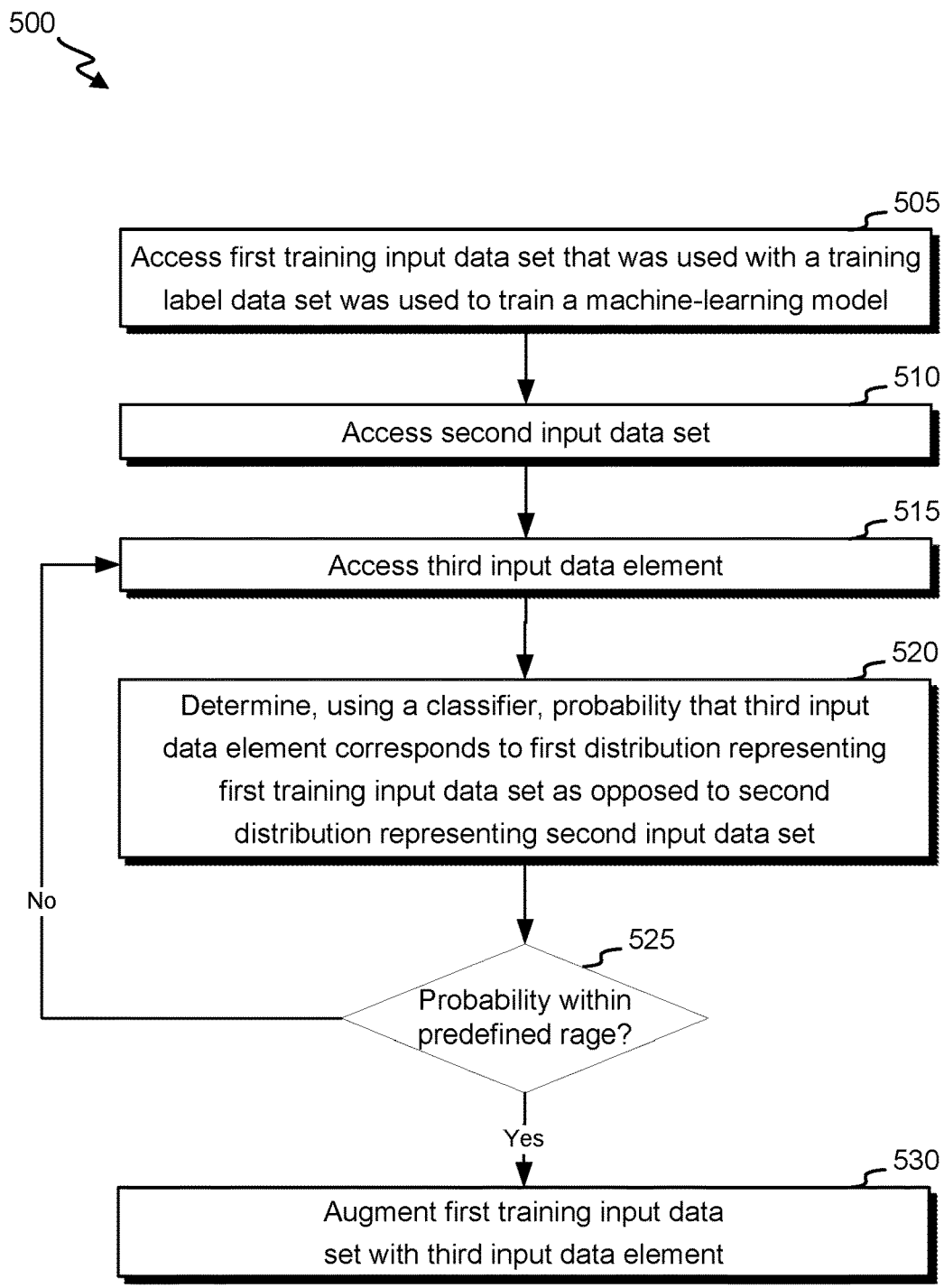
FIG. 5 illustrates a flowchart of a process for augmenting a training data set using classifications of input data elements.

FIG. 5 illustrates a flowchart of a process 500 for augmenting a training data set using classifications of input data elements. Process 500 begins at 505 where a first training input data set can be accessed. A machine-learning model may have been trained using the first training input data set and corresponding training label data.

At block 510, a second input data set can be accessed. The second input data set may have been collected from (for example) a public database or a semi-public database. In some instances, the second input data set is collected from the Internet. The second input data set may include an unlabeled data set, where each of one or more input data elements is not associated with a known label and/or known output.

At block 515, a third input data element can be accessed. The third input data element may be a data element that is part of the second input data set and/or collected in a similar or same manner used to collect the second input data set. For example, the third input data element may be collected from or identified using the Internet.

At block 520, a classifier can be used to determine a probability that the third input data element corresponds to the a first distribution representing the first training input data set (e.g., as opposed to a distribution representing the second input data set). The classifier can have one or more characteristics and/or can perform one or more operations as described herein.

At block 525, it can be determined whether the probability is within a predefined range. For example, the range can include an open range that includes an upper threshold. To illustrate, if the threshold is 50% and if the classifier predicts that it is 40% likely that the third input data element is from the first distribution, it may be determined that the probability is within the predefined range at block 525. As another example, the range can include a closed range with an upper threshold and a lower threshold.

If it is determined that the probability is not within the predefined range, process 500 can return to block 515 and another third input data element can be accessed. If it is determined that the probability is within the predefined range, process 500 can proceed to block 530, at which a first training input data set can be augmented with the third input data element. Some or all of the input data elements in the first training input data set may be associated with labels, and/or the first training input data set may be used to train a machine-learning model using supervised learning. In some instances, a training data set that includes some or all of the input data elements in the first training input data set does not include corresponding labels. A machine-learning model may be trained with the training data set using (for example) unsupervised learning (e.g., that relies on a clustering or distance-based technique).

In some instances, the full augmented first training input data set is used to train a machine-learning model. In some instances, a new portion of an augmented first training input data set (e.g., that includes one or more third input data elements associated with probabilities generated at block 520 that were within the predefined range) is used to update learned parameters of a machine-learning model.

Figure 6:
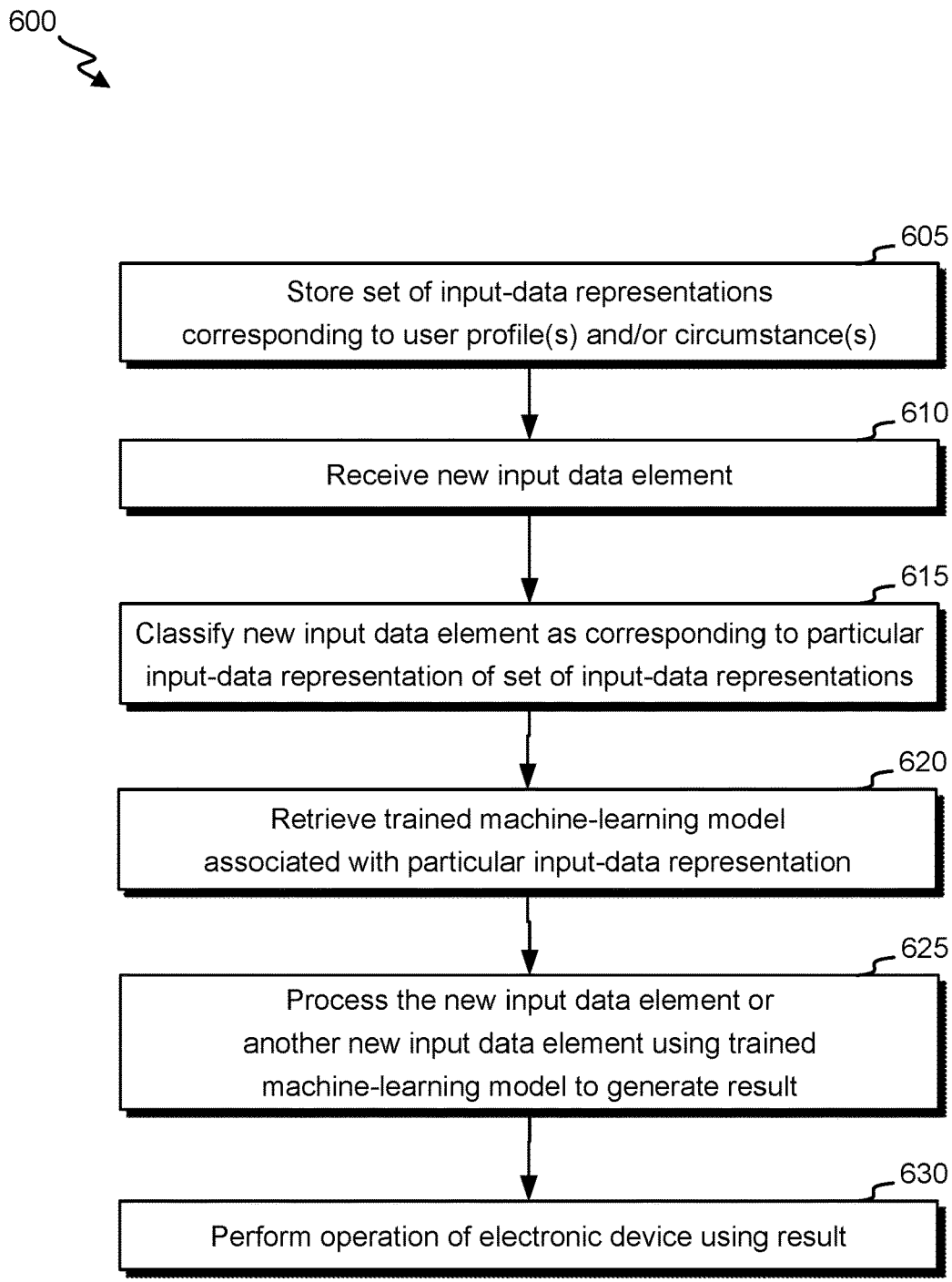
FIG. 6 illustrates a flowchart of a process for using a machine-learning model selected from multiple models.

FIG. 6 illustrates a flowchart of a process 600 for using a machine-learning model selected from multiple models. Process 600 begins at block 605, where a set of input-data representations can be stored. An input-data representation can include a collection of input data or a summary of a collection of input data (e.g., a distribution of the input data). The input data represented in an input-data representation may be multi-dimensional. The input data represented in an input-data representation may, but need not, be associated with corresponding label data.

For each representation of the set of input-data representations, input data associated with the representation may have been used to train a machine-learning model (e.g., as described herein) and/or to learn a set of parameters. Each of the set of input-data representations may be stored (e.g., at a user device or remotely, such as at a cloud server) in association with a trained machine-learning model and/or a corresponding set of learned parameters.

Each of the set of input-data representations can be associated with (for example) a user profile and/or circumstance that is unique across the set of input-data representations. An input-data representation can be associated with a particular user profile and/or circumstance as a result of the input data having been collected (for example) from a device, during a time and/or at a place associated with the user profile and/or circumstance. For example, a remote data store or a device itself may include known or estimated characteristics of a user, and subsequent data collected using the device (e.g., search terms input to the device) may be associated with the characteristic(s). Input data may then aggregated across multiple devices having a given same or similar characteristic and processed to generate a profile of input determined to correspond to the user characteristic.

At block 610, a new input data element can be received. For example, the new input data element may be detected at a user device at which the set of input-data representations are stored. The new input data element may be of a variable type that corresponds to input data points represented in the set of input-data representations.

At block 615, the new input data element can be classified as corresponding to a particular (e.g., a single) input-data representation of the set of input-data representations. The classification may be performed in accordance with a classification technique disclosed herein. In some instances, a set of features is generated based on the new input data element, and it is determined which of the set of input-data representations includes a highest representation of or corresponding to the set of features. In some instances, the set of input-data representations includes more than two input-data representations. Block 615 may then include (for example) iteratively performing multiple pairwise classifications to identify a final classification that identifies a single representation or performing a single classifications that considers all of the set of input-data representations concurrently (to generate a single predicted input-data representation as a result of a single classification performance).

At block 620, a trained machine-learning model that is associated with the particular input-data representation can be retrieved. Block 620 may include retrieving a model architecture, hyperparameters and/or learned parameters associated with the representation. In some instances, the model architecture and/or hyperparameters are the same across some or all models associated with the set of input-data representations. Learned parameters that are associated with the particular input-data representation may have been learned by processing input data that is represented by the particular input-data representation.

At block 625, the new input data element or another new input data element can be processed using the trained machine-learning model (associated with the retrieval at block 620) to generate a result. The other new input data element may include an input data element collected at and/or associated with a same device as compared to the new input data element. The new input data element and the other new input data element may further or alternatively be associated with a similar or same time period, location and/or application being executed. The other new input data element may have been collected, generated or received after the new input data element was collected, generated or received.

At block 630, an operation of the electronic device can be performed using the result. For example, block 630 can include retrieving and/or identifying query results, auto-completing input and/or recommending applications for use of download.

Figure 7:
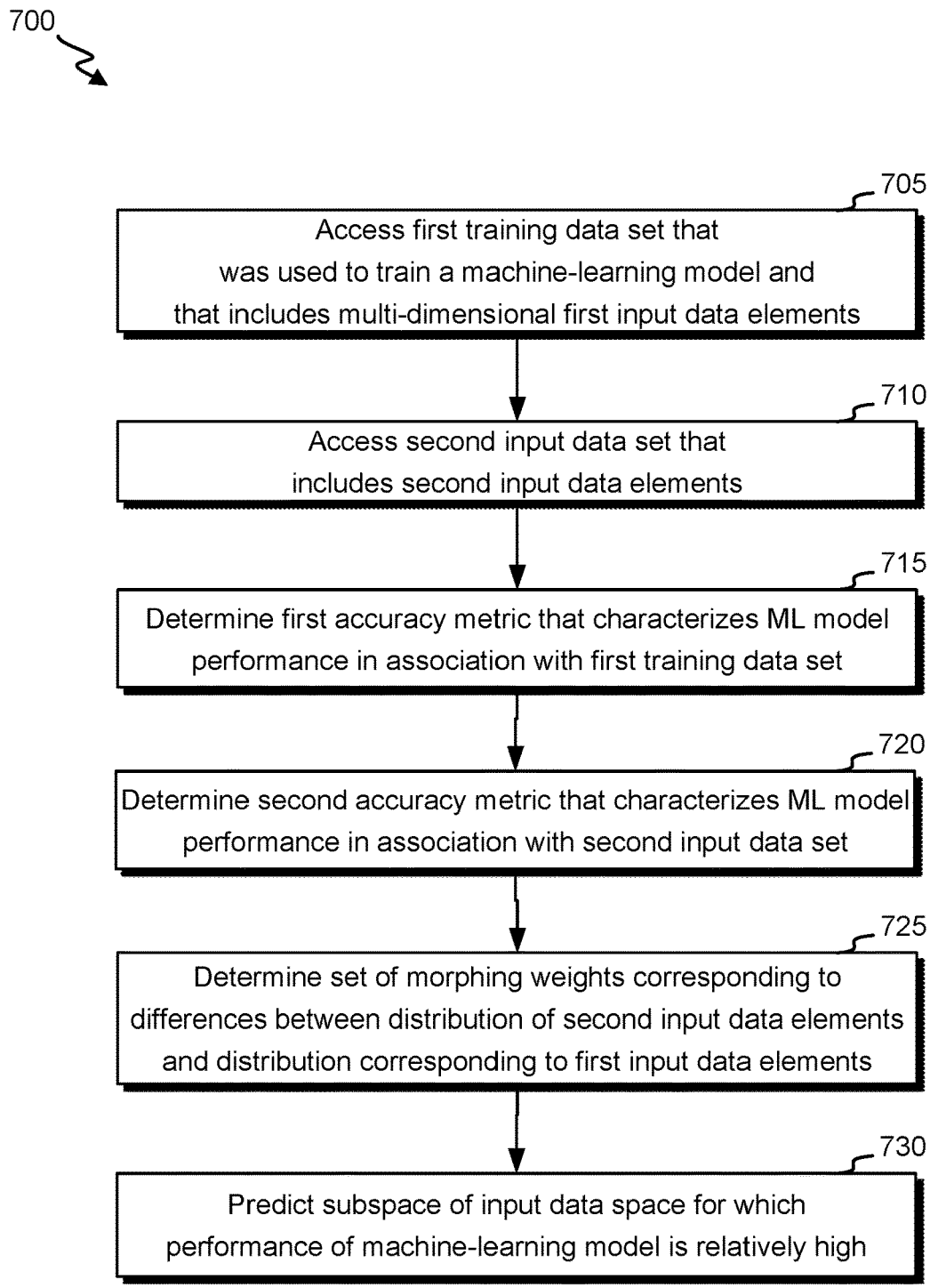
FIG. 7 illustrates a flowchart of a process for assessing multi-dimensional input data sets to detect input subspaces associated with particular performance characteristics.

FIG. 7 illustrates a flowchart of a process 700 for assessing multi-dimensional input data sets to detect input subspaces associated with particular performance characteristics. Process 700 begins at block 705, at which a first training data set can be accessed. The first training data set can include multiple first input data elements, each of which can include a multi-dimensional data element. The first training data set may, but need not, include labels that correspond to the first input data elements. The first training data set may have been used to train a machine-learning model.

At block 710, a second input data set that includes second input data elements can be accessed. The second input data elements may be of a same data type as are the first input data elements. The second input data elements may have been collected after the first input data elements, at a different device as compared to the first input data elements and/or in association with a different user as compared to the first input data elements. In some instances, the second input data elements were collected in preparation for using a machine-learning model that was trained using the first training data set.

At block 715, a first accuracy metric that characterizes a performance of the machine-learning model in association with the first training data set can be determined. At block 720, a second accuracy metric that characterizes a performance of the machine-learning model in association with the second input data set can be determined. In some instances, the second accuracy metric is indicative as stronger and/or better performance as compared to the first accuracy metric.

The first accuracy metric and/or second accuracy metric may be determined based on (for example) user interactions with a device detected after device operations are performed in accordance with results generated by the machine-learning model in response to processing input data elements. For example, content options are presented at a device can be selected based on a result from a machine-learning model. It may be inferred that the result(s) are accurate if (for example) a user selects, visits and/or downloads a presented content option (e.g., versus closing an applications and/or entering a new query, which may correspond to an inference of an inaccurate result). As another example, a prompt may be presented that requests input indicating whether a returned result and/or selected device operation corresponds to an appropriate output.

At block 725, a set of morphing weights is determined based on the first input data elements and the second input data elements. The morphing weights may be determined in accordance with a technique described herein. In some instances, a difference between a distribution of the first input data elements weighted by corresponding weights and a distribution of second first input data elements is smaller than a difference between a distribution of the (unweighted) first input data elements and the distribution of the second input data elements. The morphing weights may be defined using the distribution of the first input data elements and/or the distribution of the second input data elements. The distribution of the first input data elements and/or of the second input data elements may (for example) reflect or represent raw counts and/or frequencies of data elements within various bins (e.g., associated with one or more dimension) and/or may include a fitted function based on the data elements' values.

At block 730, the set of morphing weights can be used to identify one or more subspaces of an input data space for which performance of the machine-learning model is relatively high (e.g., as compared to other subspaces of the input data space). In instances where the second accuracy metric is indicative of stronger and/or better corresponds as compared to the first accuracy metric, identifying subspaces of an input data space that are associated with particularly high and/or particularly low morphing weights may indicate for what types of input values the machine-learning model is (for example) the most accurate. For example, a high morphing weight may indicate that there are fewer first input data elements in a subspace corresponding to the weight as compared to a quantity of second input data elements in the space. If the second accuracy metric is indicative of stronger and/or better performance as compared to the first accuracy metric, it may be predicted that the machine-learning model performs particularly well (e.g., generates relative highly accurate predictions) within the subspace (e.g., as compared to other subspaces associated with lower morphing weights). Additionally or alternatively, it may be predicted that the machine-learning model performs relatively poorly for input subspaces associated with low morphing weights (e.g., as compared to performance associated with other subspaces associated with higher morphing weights). In some instances, a predicted model-accuracy metric is generated for each of a set of (e.g., all) subspaces in an input space using a morphing weight associated with the subspace. The particularly high and/or particularly low morphing weights may be identified by selecting morphing weights that are above a predefined relative or absolute upper threshold (e.g., within a top 10% across all morphing weights) or below a predefined relative or absolute lower threshold.

As noted, it may be predicted that a model is relatively accurate within an input subspace that is associated with a relatively high morphing weight that can be used to weight the subspace within a distribution of the first input data elements to better correspond to the subspace within a distribution of the second input data elements. It will be appreciated that alternative embodiments pertaining to performance assessments are contemplated. For example, morphing weights may be generated to apply in an opposite direction and higher morphing weights may then be associated with predictions of lower accuracy. To illustrate, it may be predicted that a model is relatively accurate within an input subspace that is associated with a relatively low morphing weight that can be used to weight the subspace within a distribution of the second input data elements to better correspond to the subspace within a distribution of the first input data elements.

In some instances, identifying one or more subspaces for which it is predicted that the model performs particularly well can inform subsequent use of the model. For example, the machine-learning model may be selectively used to process input data (e.g., to identify a result, perform an operation, retrieve content, etc. based on the input) that corresponds to a morphing weight and/or predicted model-accuracy metric that exceeds a predefined threshold. In instances where input data corresponds to a morphing weight and/or predicted model-accuracy metric that does not exceed the predefined threshold, another technique may be used to process the input data.

In some instances, identifying one or more subspaces for which it is predicted that the model performs relatively poorly can inform subsequent collection of new training data. More specifically, additional training data elements (e.g., including training input data elements and potentially corresponding labels) can be selected to include training input data elements within the one or more subspaces corresponding to predicted poor model accuracy.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
accessing a first training input data set that includes a plurality of first input data elements, wherein the first training input data set and a corresponding training label data set were used to learn a set of parameter values during training of a machine-learning model, the corresponding training label data set including a plurality of labels, and wherein each of the plurality of first input data elements is multi-dimensional;
accessing a second input data set that includes a plurality of second input data elements;
generating, for each input data element of the plurality of first input data elements and of the plurality of second input data elements, a classification output that corresponds to a prediction as to whether the input data element is a sample from the first training input data set; and
determining whether a distribution of the first training input data set sufficiently corresponds to a distribution of the second input data set based on the classification outputs.

2. The method of claim 1, further comprising, when it is determined that the first training input data set does not sufficiently correspond to the second input data set:
generating a morphed version of the distribution of the first training input data set based on the distribution of the second input data set, the morphed version of the distribution of the first training input data set being generated by applying a set of morphing weights to the plurality of first input data elements;
determining whether the morphed version of the distribution of the first training input data set sufficiently corresponds to the distribution of the second input data set; and
when it is determined that the morphed version of the distribution of the first training input data set sufficiently corresponds to the distribution of the second input data set:
calculating a performance metric for the machine-learning model configured with the set of parameter values in a context of the morphed version of the distribution of the first training input data set; and
determining, based on the performance metric, whether a criteria indicative of performance degradation has been satisfied.

3. The method of claim 2, further comprising:
updating the set of parameter values using the set of morphing weights, at least some of the plurality of first input data elements and at least some of the plurality of labels.

4. The method of claim 2, further comprising, when it is determined that the morphed version of the distribution of the first training input data set does not sufficiently correspond to the distribution of the second input data set:
using the classification outputs to identify a subset of the plurality of second input data elements determined to be sufficiently different from the plurality of first input data elements;
obtaining, for each second input data element of the subset, a label;
using the labels obtained for the subset of the plurality of second input data elements to learn another set of parameter values for the machine-learning model.

5. The method of claim 2, wherein another machine-learning model was used to generate the classification outputs and further to generate a set of corresponding confidence metrics, and wherein the method further comprises:
determining the set of morphing weights using the set of corresponding confidence metrics.

6. The method of claim 1, further comprising, when it is determined that the first training input data set sufficiently corresponds to the second input data set:
availing the machine-learning model, configured with the set of parameter values, for subsequent use to process subsequently detected input data elements.

7. The method of claim 1, wherein:
each of the first input data elements correspond to a first user of one or more first users and/or a first device of one or more first devices;
each of the second input data elements corresponds to:
a second user different than each of the one or more first users; and/or
a second device different than each of the one or more first devices;
the method further includes, when it is determined that the first training input data set does not sufficiently correspond to the second input data set, inhibiting subsequent use of the machine-learning model configured with the set of parameters in a context of processing other input data elements that correspond to the second user and/or to the second device.

8. The method of claim 1, wherein the classification outputs are generated using another machine-learning model that includes a decision-tree model, regression model, a support vector machine, or a random-forest model.

9. The method of claim 1, wherein determining whether the distribution of the first training input data set sufficiently corresponds to the distribution of the second input data set includes:
generating a receiver-operator curve using the classification outputs;
determining an area under the receiver-operator curve; and
determining whether the area under the receiver-operator curve is below a pre-determined threshold.

10. The method of claim 1, further comprising:
accessing a set of third training input data sets, wherein each third input data set of the set of third training input data sets includes a plurality of third input data elements, each third input data set of the set of third training input data sets corresponding to a distinct time period relative to the time period associated with each other third input data set of the set of third training input data sets and relative to the first training input data set;
determining a first set of morphing weights that correspond to differences in a distribution of the plurality of first input data elements across an input data space relative to a distribution of the second input data elements across the input data space;
determining, for each third training input data set of the set of third training input data sets, a second set of morphing weights that correspond to differences in a distribution of the plurality of third input data elements across the input data space relative to the distribution of the second input data elements across the input data space;
determining a morphing-weight temporal pattern using the first and second sets of morphing weights and the distinct time periods corresponding to the first and third training input data sets;

accessing a new input data element corresponding to a particular time point;

determining a result for the new input data element based on the particular time point, the morphing-weight temporal pattern, and the machine-learning model configured with a particular set of learned parameters; and outputting the result.

11. A system comprising:

one or more data processors; and a non-transitory computer readable storage medium containing instructions which, when executed on the one or more data processors, cause the one or more data processors to perform a set of actions including:

accessing a first training input data set that includes a plurality of first input data elements, wherein the first training input data set and a corresponding training label data set were used to learn a set of parameter values during training of a machine-learning model, the corresponding training label data set including a plurality of labels, and wherein each of the plurality of first input data elements is multi-dimensional;

accessing a second input data set that includes a plurality of second input data elements;

generating, for each input data element of the plurality of first input data elements and of the plurality of second input data elements, a classification output that corresponds to a prediction as to whether the input data element is a sample from the first training input data set; and determining whether a distribution of the first training input data set sufficiently corresponds to a distribution of the second input data set based on the classification outputs.

12. The system of claim 11, wherein the set of actions further include, when it is determined that the first training input data set does not sufficiently correspond to the second input data set:

generating a morphed version of the distribution of the first training input data set based on the distribution of the second input data set, the morphed version of the distribution of the first training input data set being generated by applying a set of morphing weights to the plurality of first input data elements;

determining whether the morphed version of the distribution of the first training input data set sufficiently corresponds to the distribution of the second input data set; and when it is determined that the morphed version of the distribution of the first training input data set sufficiently corresponds to the distribution of the second input data set:

calculating a performance metric for the machine-learning model configured with the set of parameter values in a context of the morphed version of the distribution of the first training input data set; and determining, based on the performance metric, whether a criteria indicative of performance degradation has been satisfied.

13. The system of claim 12, wherein the set of actions further include:

updating the set of parameter values using the set of morphing weights, at least some of the plurality of first input data elements and at least some of the plurality of labels.

14. The system of claim 12, wherein the set of actions further include, when it is determined that the morphed version of the distribution of the first training input data set does not sufficiently correspond to the distribution of the second input data set:

using the classification outputs to identify a subset of the plurality of second input data elements determined to be sufficiently different from the plurality of first input data elements;

obtaining, for each second input data element of the subset, a label;

using the labels obtained for the subset of the plurality of second input data elements to learn another set of parameter values for the machine-learning model.

15. The system of claim 12, wherein another machine-learning model was used to generate the classification outputs and further to generate a set of corresponding confidence metrics, and wherein the set of actions further include:

determining the set of morphing weights using the set of corresponding confidence metrics.

16. The system of claim 12, wherein the set of actions further include, when it is determined that the first training input data set sufficiently corresponds to the second input data set:

availing the machine-learning model, configured with the set of parameter values, for subsequent use to process subsequently detected input data elements.

17. The system of claim 11, wherein:

each of the first input data elements correspond to a first user of one or more first users and/or a first device of one or more first devices;

each of the second input data elements corresponds to:

a second user different than each of the one or more first users; and/or a second device different than each of the one or more first devices;

the set of actions further includes, when it is determined that the first training input data set does not sufficiently correspond to the second input data set, inhibiting subsequent use of the machine-learning model configured with the set of parameters in a context of processing other input data elements that correspond to the second user and/or to the second device.

18. The system of claim 11, wherein determining whether the distribution of the first training input data set sufficiently corresponds to the distribution of the second input data set includes:

generating a receiver-operator curve using the classification outputs;

determining an area under the receiver-operator curve; and determining whether the area under the receiver-operator curve is below a pre-determined threshold.

19. A computer-program product tangibly embodied in a non-transitory machine-readable storage medium, including instructions configured to cause one or more data processors to perform a set of actions including:

accessing a first training input data set that includes a plurality of first input data elements, wherein the first training input data set and a corresponding training label data set were used to learn a set of parameter values during training of a machine-learning model, the corresponding training label data set including a plurality of labels, and wherein each of the plurality of first input data elements is multi-dimensional;

accessing a second input data set that includes a plurality of second input data elements;

generating, for each input data element of the plurality of first input data elements and of the plurality of second input data elements, a classification output that corresponds to a prediction as to whether the input data element is a sample from the first training input data set; and determining whether a distribution of the first training input data set sufficiently corresponds to a distribution of the second input data set based on the classification outputs.

20. The computer-program product of claim 19, wherein the set of actions further include, when it is determined that the first training input data set does not sufficiently correspond to the second input data set:

generating a morphed version of the distribution of the first training input data set based on the distribution of the second input data set, the morphed version of the distribution of the first training input data set being generated by applying a set of morphing weights to the plurality of first input data elements;

determining whether the morphed version of the distribution of the first training input data set sufficiently corresponds to the distribution of the second input data set; and when it is determined that the morphed version of the distribution of the first training input data set sufficiently corresponds to the distribution of the second input data set:

calculating a performance metric for the machine-learning model configured with the set of parameter values in a context of the morphed version of the distribution of the first training input data set; and determining, based on the performance metric, whether a criteria indicative of performance degradation has been satisfied.

\* \* \* \* \*